US012581153B2

(12) United States Patent　　　　(10) Patent No.:　US 12,581,153 B2
Kusano　　　　　　　　　　　　　　(45) **Date of Patent:　*Mar. 17, 2026**

(54) SERVER SYSTEM, APPLICATION PROGRAM DISTRIBUTION SERVER, VIEWING TERMINAL, CONTENT VIEWING METHOD, APPLICATION PROGRAM, DISTRIBUTION METHOD, AND APPLICATION PROGRAM DISTRIBUTION METHOD

(71) Applicant: DWANGO Co., Ltd., Tokyo (JP)

(72) Inventor: Kazuhiko Kusano, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 18/433,961

(22) Filed: Feb. 6, 2024

(65) Prior Publication Data

US 2024/0179367 A1　　May 30, 2024

Related U.S. Application Data

(63) Continuation of application No. 17/263,683, filed as application No. PCT/JP2019/037584 on Sep. 25, 2019, now Pat. No. 11,936,939.

(30) Foreign Application Priority Data

Sep. 26, 2018　(JP) ................................. 2018-193849

(51) Int. Cl.
　　*H04N 21/431*　　　(2011.01)
　　*H04N 21/2187*　　(2011.01)
　　　　　　(Continued)
(52) U.S. Cl.
　　CPC ..... *H04N 21/4316* (2013.01); *H04N 21/2187* (2013.01); *H04N 21/4788* (2013.01); *H04N 21/4858* (2013.01); *H04N 21/8173* (2013.01)

(58) Field of Classification Search
　　CPC ........... H04N 21/4316; H04N 21/2187; H04N 21/4788; H04N 21/4858; H04N 21/8173
　　See application file for complete search history.

(56) References Cited

U.S. PATENT DOCUMENTS 7,036,083 B1　4/2006　Zenith
9,066,145 B2　6/2015　Kilar et al.
　　　　(Continued)

FOREIGN PATENT DOCUMENTS

CN　　101004737 A　　7/2007
CN　　103140825 A　　6/2013
　　　　(Continued)

OTHER PUBLICATIONS

International Search Report and Written Opinion dated Dec. 17, 2019 in corresponding application No. PCT/JP2019/037584; 7 pages.

(Continued)

*Primary Examiner* — Ngoc K Vu
(74) *Attorney, Agent, or Firm* — Maier & Maier, PLLC

(57)　　　　ABSTRACT

A server system, application program distribution server, viewing terminal, content viewing method, application program, distribution method, and application program distribution method, in a content distribution system and the like. Posted comments can be played together with content, objects in a content play screen which each viewer desires to view can be viewed without being obstructed by the comments and each of the comments can also be viewed. Areas desired by the viewers are made selectable in a display screen on a terminal which plays content, and comments are not displayed in the selected areas.

7 Claims, 13 Drawing Sheets

(51) Int. Cl.
      *H04N 21/4788*        (2011.01)
      *H04N 21/485*          (2011.01)
      *H04N 21/81*            (2011.01)

(56)              References Cited

U.S. PATENT DOCUMENTS

| | | | |
|---|---|---|---|
| 10,944,707 B2 * | 3/2021 | Lee | H04L 51/52 |
| 11,936,939 B2 * | 3/2024 | Kusano | H04N 21/4316 |
| 2007/0245243 A1 | 10/2007 | Lanza et al. | |
| 2009/0063991 A1 * | 3/2009 | Baron | H04L 12/1822 |
| | | | 715/751 |
| 2011/0112665 A1 | 5/2011 | Roberts et al. | |
| 2012/0150698 A1 | 6/2012 | Mcclements | |
| 2013/0139060 A1 | 5/2013 | Chae | |
| 2014/0089423 A1 | 3/2014 | Jackels et al. | |
| 2015/0277732 A1 | 10/2015 | Billgren et al. | |
| 2016/0277328 A1 | 9/2016 | Ishizuka | |
| 2017/0289619 A1 | 10/2017 | Xu et al. | |
| 2018/0278995 A1 | 9/2018 | Takahashi | |
| 2021/0168462 A1 | 6/2021 | April et al. | |

FOREIGN PATENT DOCUMENTS

| | | | |
|---|---|---|---|
| CN | 103581280 | A | 2/2014 |
| JP | 2003-283981 | A | 10/2003 |
| JP | 2009-77443 | A | 4/2009 |
| JP | 2013-46198 | A | 3/2013 |
| JP | 2016-71887 | A | 5/2016 |
| JP | 2016-105600 | A | 6/2016 |

OTHER PUBLICATIONS

Decision to Grant a Patent issued on Jul. 2, 2019 in corresponding application No. 2018-193849; 10 pages.
Notice of Reasons for Refusal issued on Mar. 5, 2019 in corresponding application No. 2018-193849; 7 pages.
Chinese Office Action issued on Aug. 11, 2021, in connection with corresponding CN Application No. 201980046412.X (11 pp., including machine-generated English translation).

* cited by examiner

SERVER SYSTEM, APPLICATION PROGRAM DISTRIBUTION SERVER, VIEWING TERMINAL, CONTENT VIEWING METHOD, APPLICATION PROGRAM, DISTRIBUTION METHOD, AND APPLICATION PROGRAM DISTRIBUTION METHOD

CROSS-REFERENCE TO RELATED APPLICATIONS

This application is a Continuation application of U.S. patent application Ser. No. 17/263,683, filed on Jan. 27, 2021, which is a Continuation of International Application No. PCT/JP2019/037584, filed on Sep. 25, 20219, and based upon and claiming the benefit of priority from Japanese Patent Application No. 2018-193849, filed on Sep. 26, 2018, the entire contents of all of which are incorporated herein by reference.

FIELD

The present disclosure relates to a server system, an application program distribution server, a viewing terminal, a content viewing method, an application program, a distribution method, and an application program distribution method suitable for a distribution and reception system of a content including a moving image and/or a still image, an electronic book reader, or the like.

BACKGROUND

The present invention can be implemented in various fields, and a technology of the related art will be described by using a distribution and reception system of a content including a moving image, as an example.

A configuration has been known in which a content including a moving image is distributed to a user terminal (a personal computer, a tablet terminal, a smart phone, or the like) from a server, and a user views a content play image on a display screen of the terminal.

For example, in Patent Document 1 described below, a video comment input and display system is disclosed in which an image poster posts a posted moving image that is a content posted in advance, a comment poster who is the other viewer posts a comment (text data), and when a third person who is the other viewer plays the content by using the own terminal, the comment is displayed in the form of a speech balloon with respect to the content on a play screen.

In addition, similarly, in Patent Documents 2 to 4, a system is disclosed in which the comment poster posts a comment with respect to a moving image content that is posted in advance, and when the third person who is the other viewer plays the moving image content, the third person is capable of viewing the posted comments together.

Patent Document

Patent Document 1: JP-A-2003-283981
Patent Document 2: JP-A-2016-105600
Patent Document 3: JP-A-2009-212705
Patent Document 4: JP-A-2018-55000

SUMMARY

In the post of the comment with respect to the moving image content, described above, the impression, the compliment, the opinion, the tweet, or the like of the content is usually performed by the comment poster who is the viewer, the comment poster posts the comment in accordance with a play scene of the content, and when the third person plays the content, the comment is played in synchronization with a play time posted as described above.

For this reason, the comment tends to be concentrated on a popular content or a scene with a high attention degree in one content, and in a play scene to which excessive comments are posted, the play screen is overwhelmed with the comments, and thus, there was a concern that the comment becomes an obstruction at the time of viewing the screen of the original content.

For this problem, in the configuration disclosed in Patent Document 1, described above, as illustrated in FIGS. 15(A) and 15(B) that are the drawings attached herein in which FIG. 28 and FIG. 40 of Patent Document 1 are retaken, a content (a moving image) wanted to be viewed was displayed in the center of the display screen as a small screen, a comment was displayed in the form of a speech balloon around the outside of the small screen. For this reason, in the configuration disclosed in Patent Document 1, the content is displayed only on the small screen, and thus, the size is not sufficient for viewing. In addition, in a case where the number of comments increases and the number of letters of the comment increases, all of the comments displayed in the form of a speech balloon around the small screen are not capable of being displayed.

Similarly, in the configuration disclosed in Patent Document 2, as described in Paragraph 0084 or the like, in a system a video is posted and is distributed from a server of an operator, a function of setting a specific comment designated by a video poster to non-display or a function of eliminating only a specific comment designated by the viewer from the screen (not displaying the comment on the screen) are disclosed. However, in a case where the video poster selects a comment not to be displayed, needs for viewing the area of video display that the viewer originally wanted to watch, for example, a specific performer or display item without being obstructed by the comment are not be capable of being satisfied, and even in a case where the viewer designates a specific comment and sets the comment to non-display, in the assumed system, each comment is displayed on a video display screen by being sequentially moved (scrolled) to the left from the right of the screen, and thus, even in the case of setting only a certain specific comment not to be displayed, the other comments are subjected to scroll display on the performer or the like that the viewer wants to watch, and therefore, similarly, needs for viewing a specific performer or display item without being obstructed by the comment are not capable of being satisfied.

Similarly, in the configuration disclosed in Patent Document 3, in Paragraph 0034, Paragraph 0084, or the like, a function for the video poster to set the comment not to be displayed only in a specific area of a content display screen is disclosed. However, a case where the video poster determines a non-display area and directly performs distribution, in a television broadcasting program is same as a case where the configuration of the screen is determined by a broadcast station, and the preference and the selection of the viewer are not capable of being reflected at all. A certain viewer may want to closely watch a certain performer in a comment-free mode, or the other viewer may want to closely watch another performer. Further, another viewer may want to read the comment. In the configuration disclosed in Patent Document 3, needs of such various viewers were not capable of being satisfied.

Further, similarly, in the configuration disclosed in Patent Document 4, as a developed form of the invention for normally displaying a comment (remaining still straight to a horizontal line) even in a case where a PDA terminal of the viewer is inclined or vibrated, there is description of an example relevant to a function of eliminating all comments by the viewer shaking the PDA. In a viewing terminal of the viewer, a selection function of displaying all of the comments or of not displaying all of the comments is disclosed in other documents, and in such a function, needs for reading the comment and for closely viewing the own desired object (performer or the like) were not capable of being satisfied.

As described above, the invention has been made in order to solve the problems of the technology of the related art, and an object thereof is to provide a server system, a distribution method, and a computer program with which, in particular, in a content distribution system or the like in which a posted comment can be played together with a content, a desired object of each viewer can be viewed without being obstructed by the comment, and each comment can also be viewed.

In order to attain the object described above, the invention provides a server system, an application program distribution server, a viewing terminal, a content viewing method, an application program, a distribution method, and an application program distribution method, described below.

1)

A server system, including:

a content distribution unit that distributes a video content and/or an image content for live broadcast or play to each terminal for viewing; and a user posting information distribution unit that receives user posting information added at a desired display timing of the content by any one of each of the terminals for viewing from the terminal, and distributes the user posting information to each of the terminals for viewing such that in each of the terminals for viewing including the terminal, the user posting information is superimposed on a content display screen at the display timing, in any one of a single server or a plurality of servers, characterized in that the server system further includes a program distribution unit that distributes a program for performing control such that a display mode of the user posting information inside and outside a specific area that is selected is different to each of the terminals for viewing including at least a viewing terminal, after when the specific area of the screen displaying the content is subjected to a selection manipulation by using an area selection unit provided in the viewing terminal that is any one of each of the terminals for viewing, during a period in which the selection is effective, in the viewing terminal.

2)

The server system according to 1), characterized in that the display mode is at least one of (A) to (J) described below:

(A) the presence or absence of letter information display;

(B) a color of the letter information display;

(C) a transparency of the letter information display;

(D) a letter size of the letter information display;

(E) a display change according to preparation or correction history of letter information;

(F) a display change according to meaning or attribute of the letter information;

(G) the presence or absence of display with respect to each of a plurality of letter information items to be displayed overlapping or a display order;

(H) display execution of the letter information that is not displayed except for when a manipulation using the area selection unit is executed;

(I) the presence or absence of display with respect to letter information that is selected in accordance with criteria set in advance from the letter information; and (J) the presence or absence of advertisement display in the specific area.

3)

An application program distribution server, including:

a distribution unit that downloads and distributes an application program to be operated in each terminal to each of the terminals for viewing, for viewing a video content and/or an image content for live broadcast or play, characterized in that the application program is configured to perform each control such that each of the terminals for viewing that is being operated by downloading and receiving the application program receives the content that is distributed by a content distribution server and displays the content on a display screen, receives user posting information added at a desired display timing of the content by any one of terminals viewing the content from a user posting information distribution server and superimposes the user posting information on content display of the display screen at the display timing, and allows a display mode of the user posting information inside and outside a specific area that is selected to be different, in a viewing terminal in which the specific area of the display screen displaying the content is subjected to a selection manipulation.

4)

A viewing terminal for viewing a video content and/or an image content for live broadcast or play, the terminal including:

a content receiving unit that receives the content that is distributed by a content distribution server and displays the content on a display screen;

a user posting information receiving unit that receives user posting information added at a desired display timing of the content by any one of terminals viewing the content from a user posting information distribution server, and superimposes the user posting information on content display of the display screen at the display timing; and an area selection unit that performs control such that a manipulation for selecting a specific area of the screen displaying the content is enabled, and a display mode of the user posting information inside and outside the selected specific area in the viewing terminal is different.

5)

A content viewing method for viewing a video content and/or an image content for live broadcast or play by using a viewing terminal, the method including:

a content receiving step of allowing a content receiving unit of the viewing terminal to receive the content that is distributed by a content distribution server and to display the content on a display screen;

a user posting information receiving step of allowing a user posting information receiving unit of the viewing terminal to receive user posting information added at a desired display timing of the content by any one of terminals viewing the content from a user posting information distribution server and to superimpose the user posting information on content display of the display screen at the display timing; and an area selecting step of allowing an area selection unit of the viewing terminal to perform control such that a display mode of the user posting information inside and outside a specific area that is selected is different when the specific area of the screen displaying the content is subjected to a selection manipulation, in the viewing terminal.

6)

The content viewing method according to 5), characterized in that the display mode is at least one of (A) to (J) described below:

(A) the presence or absence of letter information display;

(B) a color of the letter information display;

(C) a transparency of the letter information display;

(D) a letter size of the letter information display;

(E) a display change according to preparation or correction history of letter information;

(F) a display change according to meaning or attribute of the letter information;

(G) the presence or absence of display with respect to each of a plurality of letter information items to be displayed overlapping or a display order;

(H) display execution of the letter information that is not displayed except for when a manipulation using the area selection unit is executed;

(I) the presence or absence of display with respect to letter information that is selected in accordance with criteria set in advance from the letter information; and (J) the presence or absence of advertisement display in the specific area.

7)

The content viewing method according to 5) or 6), characterized in that the area selection unit has at least one configuration of (a) to (f) described below:

(a) a mouse pointer;

(b) a cursor movement manipulation key;

(c) a combination of a protrusion and a display panel with a contact sensing function;

(d) a combination of a light projection unit and a display panel with a light sensing function;

(e) a device sensing a visual line direction of a user; and (f) a manipulation device using a voice recognition technology.

8)

An application program for allowing the viewing terminal to execute each of the steps of the content viewing method according to any one of 5) to 7).

9)

A distribution method, including:

a content distributing step of allowing a content distribution unit provided in any one of a single server or a plurality of servers provided in a server system to distribute a video content and/or an image content for live broadcast or play to each terminal for viewing; and a user posting information distributing step of allowing a user posting information distribution unit provided in any one of each of the servers to receive user posting information added at a desired display timing of the content by any one of each of the terminals for viewing from the terminal and to distribute the user posting information to each of the terminals for viewing such that in each of the terminals for viewing including the terminal, the user posting information is superimposed on a display screen of the content at the display timing,

characterized in that the distribution method further includes a program distributing step of allowing a program distribution unit provided in any one of each of the servers to distribute a program for performing control of the display screen such that a display mode of the user posting information inside and outside a specific area that is selected is different to a part or all of each of the terminals for viewing including at least a viewing terminal, after when the specific area of the screen displaying the content is subjected to a selection manipulation by using an area selection unit provided in the viewing terminal that is any one of each of the terminals for viewing, during a period in which the selection is effective, in the viewing terminal, before the content distributing step and the user posting information distributing step are executed.

10)

An application program distribution method, including:

a distributing step of allowing a distribution unit of an application program distribution server to download and distribute an application program to be operated in each terminal to each of the terminals for viewing, for viewing a video content and/or an image content for live broadcast or play, characterized in that each control is configured to be performed such that a viewing terminal that is being operated by the application program receives the content that is distributed by a content distribution server and displays the content on a display screen, receives user posting information added at a desired display timing of the content by any one of terminals viewing the content from a user posting information distribution server and superimposes the user posting information on content display of the display screen at the display timing, and allows a display mode of the user posting information inside and outside a specific area that is selected to be different, in a viewing terminal in which the specific area of the display screen displaying the content is subjected to a selection manipulation.

According to such a configuration described above, the invention is capable of providing a server system, an application program distribution server, a viewing terminal, a content viewing method, an application program, a distribution method, and an application program distribution method with which, in a content distribution system or the like in which a posted comment can be played together with a content, a desired object of each viewer can be viewed without being obstructed by the comment, and each comment can also be viewed.

BRIEF DESCRIPTION OF THE DRAWINGS

FIG. 1 is a diagram schematically illustrating a configuration of a content distribution and reception system according to the invention.

7

Figure 4:
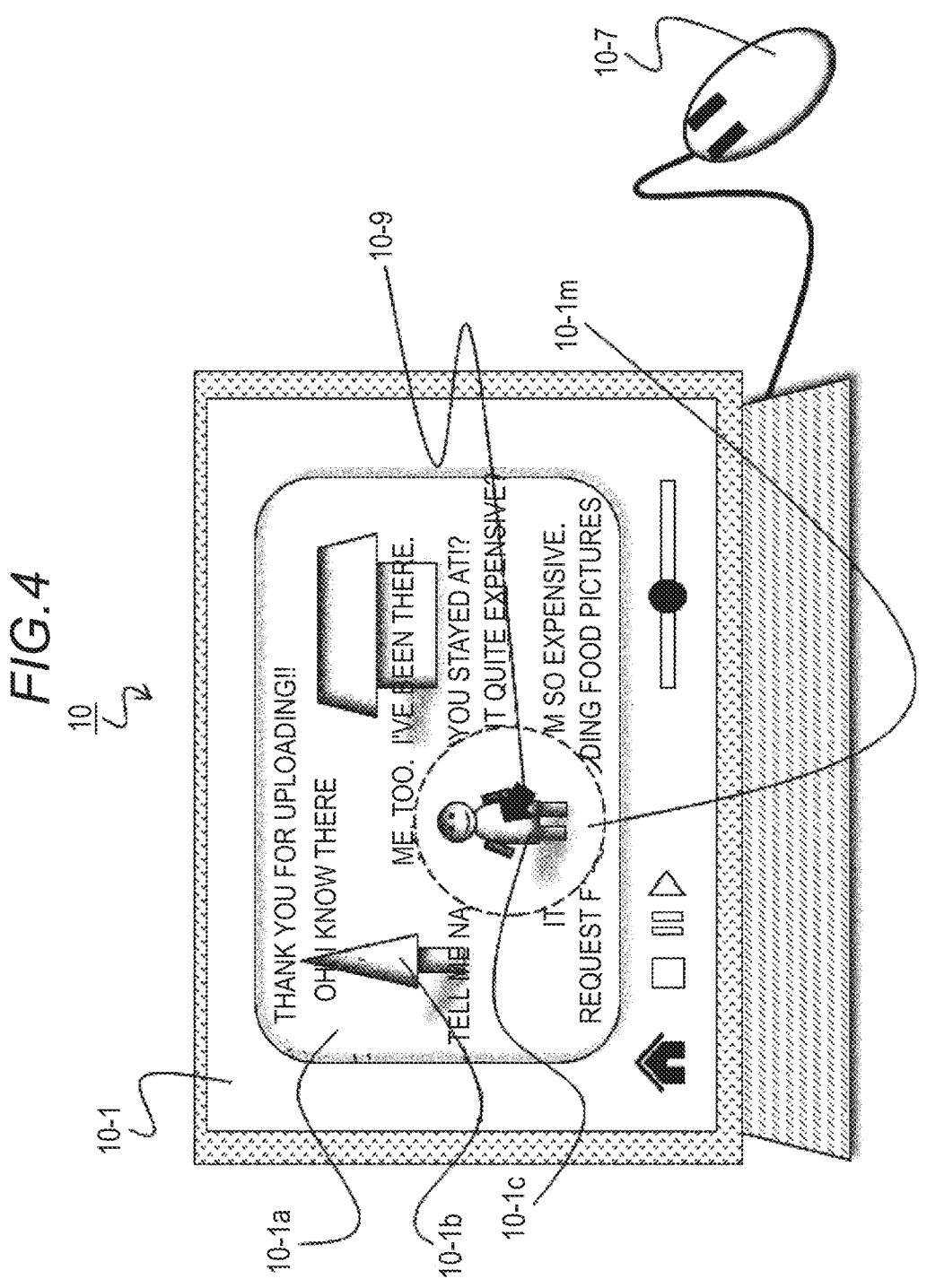
FIG. 4 is a diagram schematically illustrating the appearance and the configuration of the viewer terminal provided in the content distribution and reception system of FIG. 1.
Figure 6:
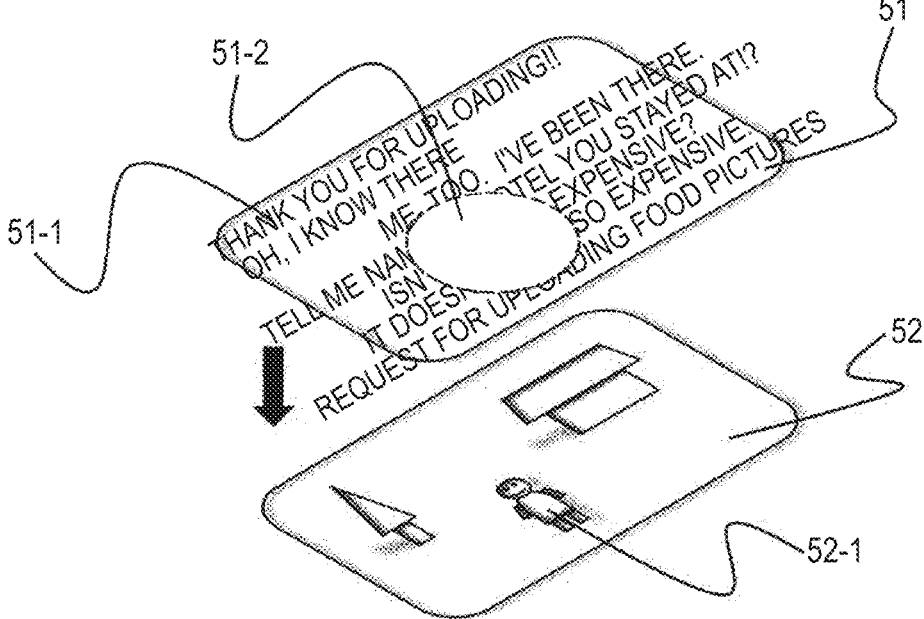

FIG. 6 is a diagram schematically illustrating the operation principle of the viewer terminal illustrated in FIG. 4.

Figure 7:
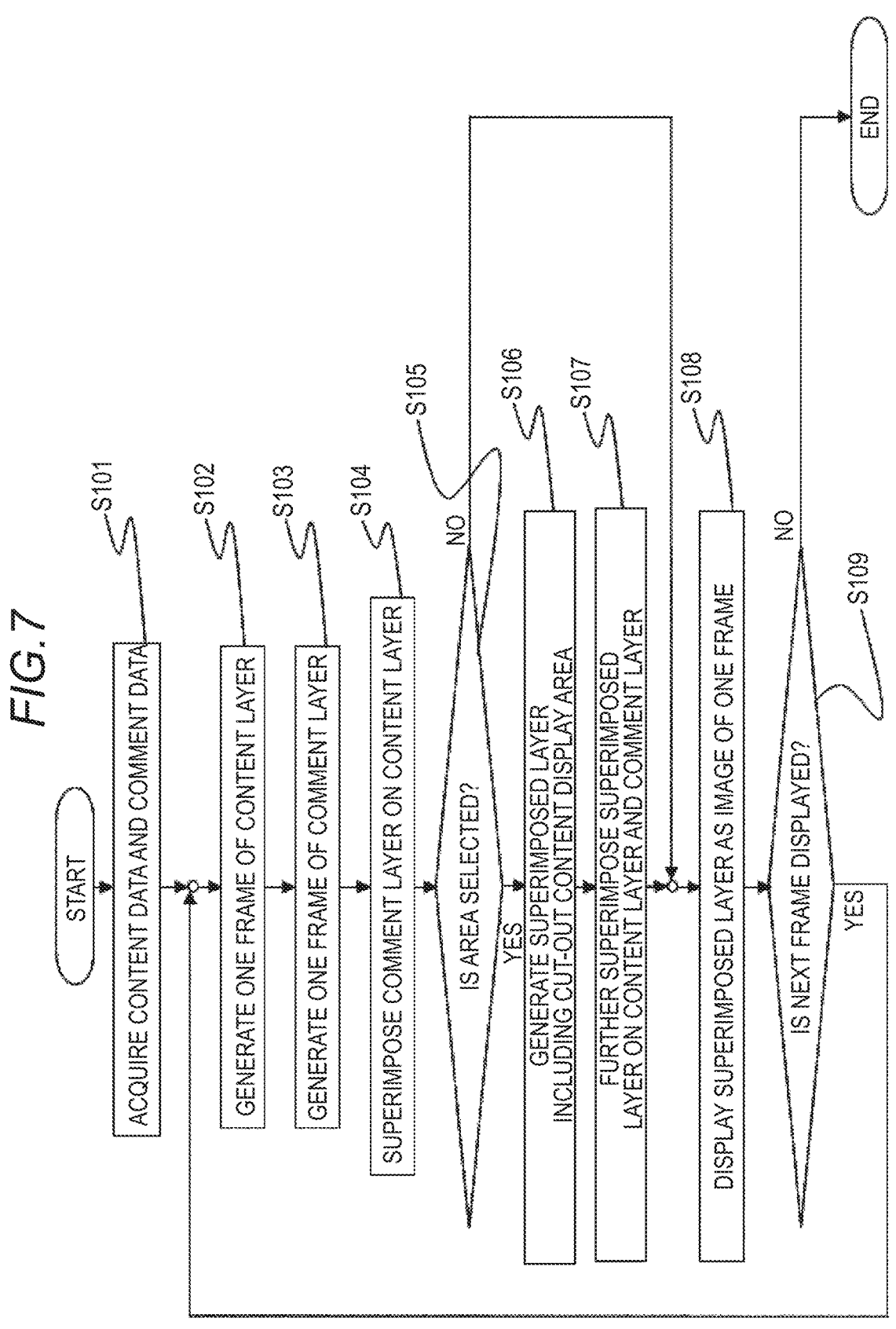

FIG. 7 is a flowchart describing an operation of a viewer terminal in a content distribution and reception system that is a first embodiment according to the invention.

Figure 8:
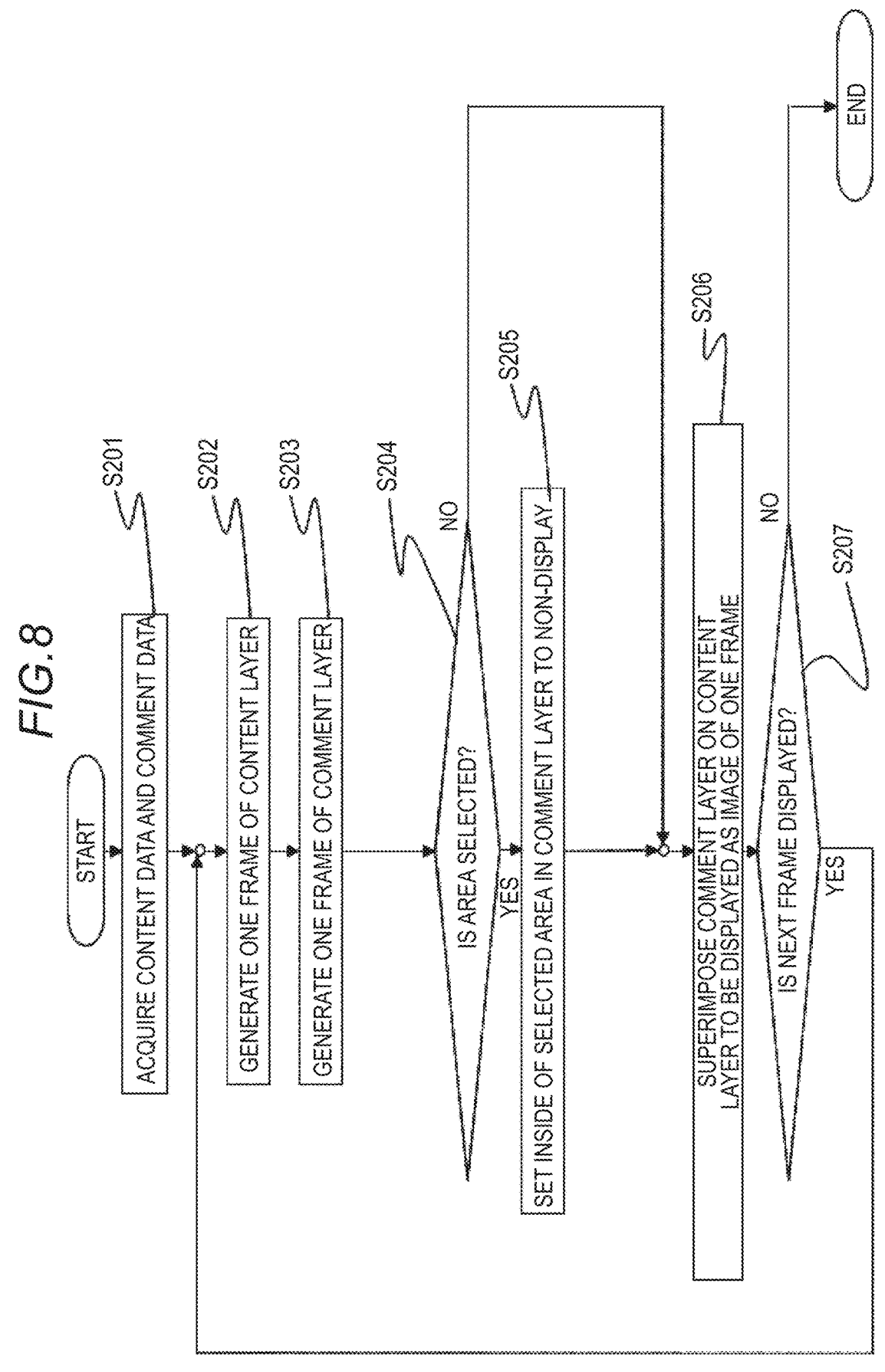

FIG. 8 is a flowchart describing the operation of the viewer terminal in the content distribution and reception system that is the first embodiment according to the invention.

Figure 9:
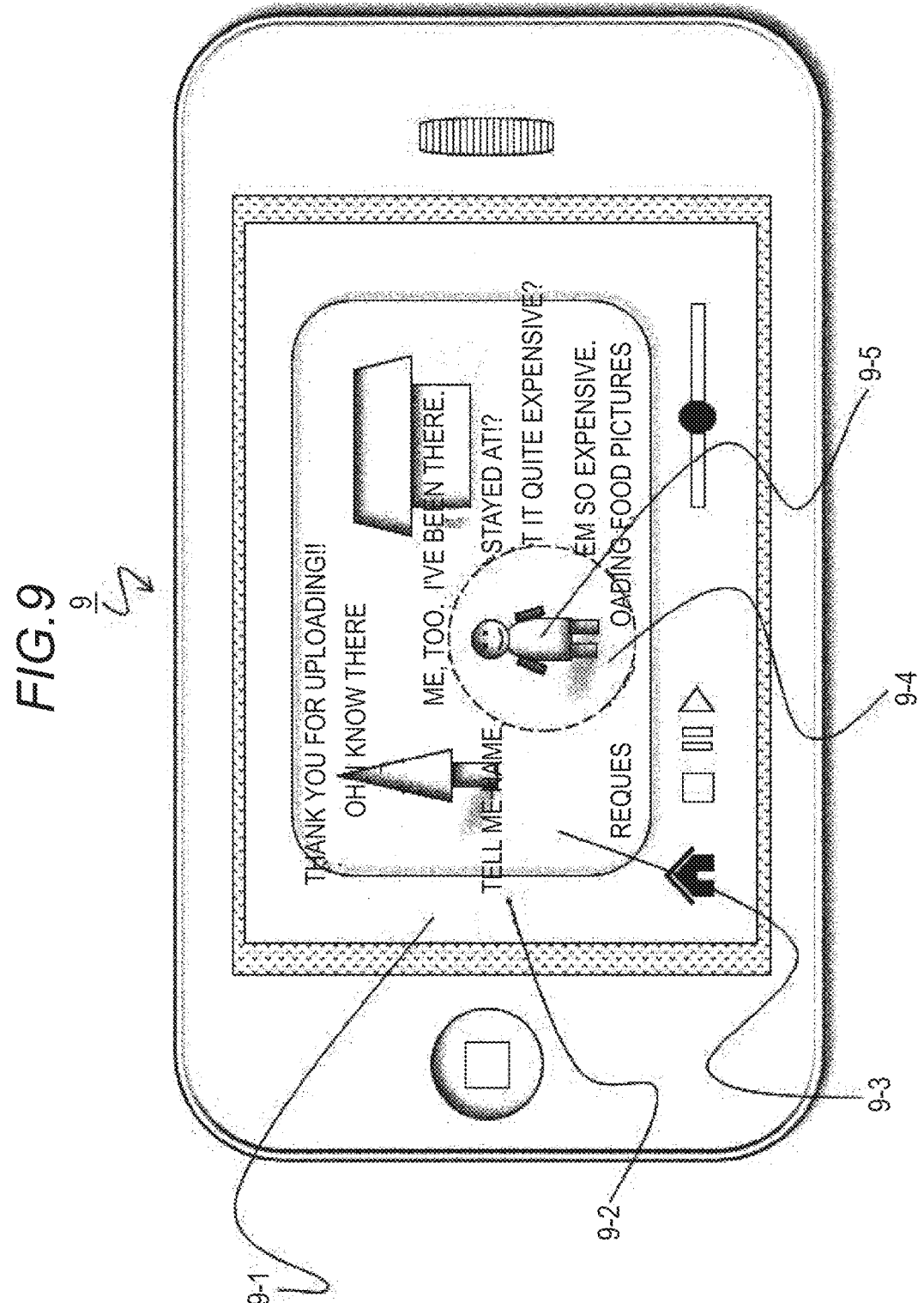

FIG. 9 is a schematic view of an appearance of a smart phone in a content distribution and reception system that is a third embodiment according to the invention.

Figure 10:
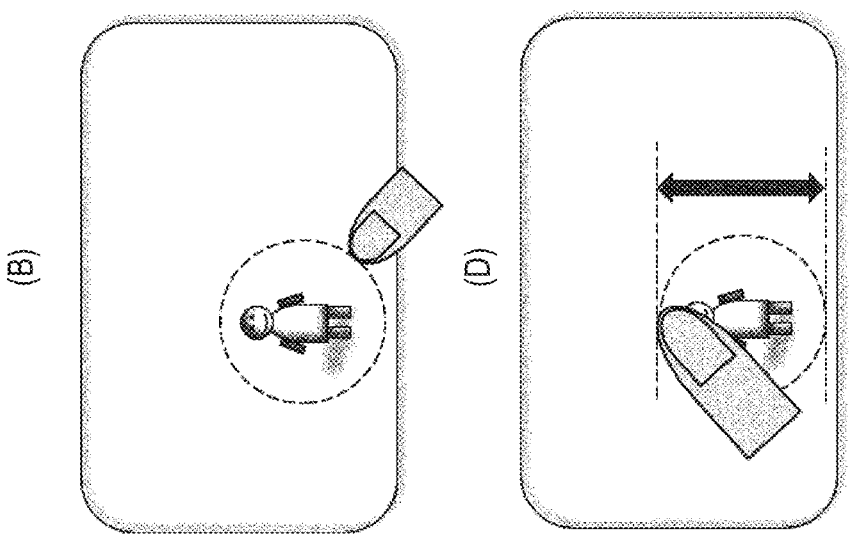
Figure 10:
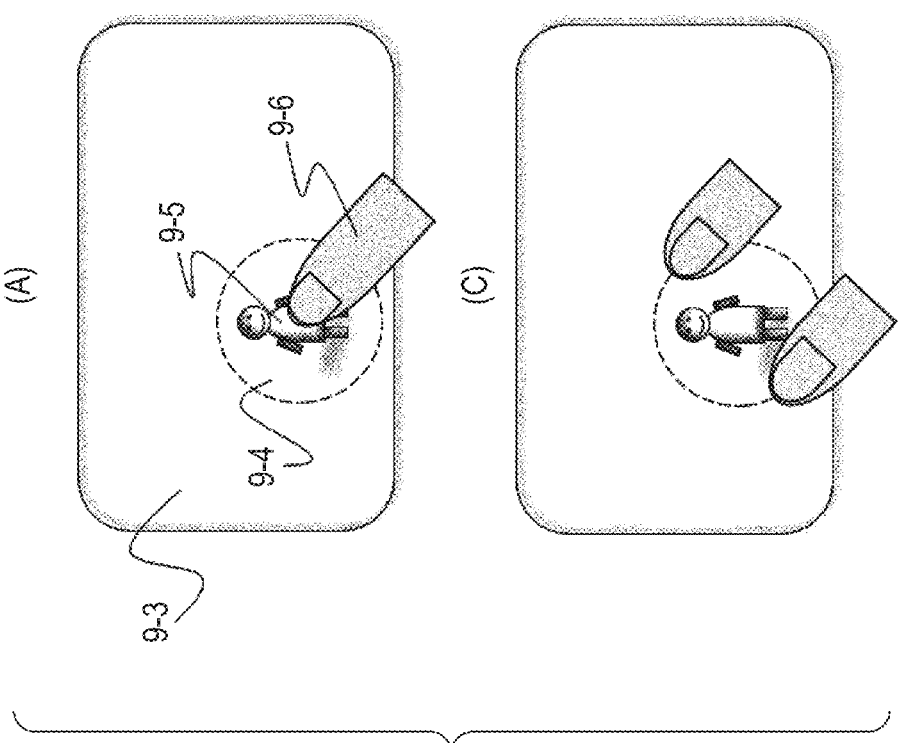

FIG. 10 is a schematic view illustrating an example of a manipulation using the smart phone illustrated in FIG. 9.

Figure 11:
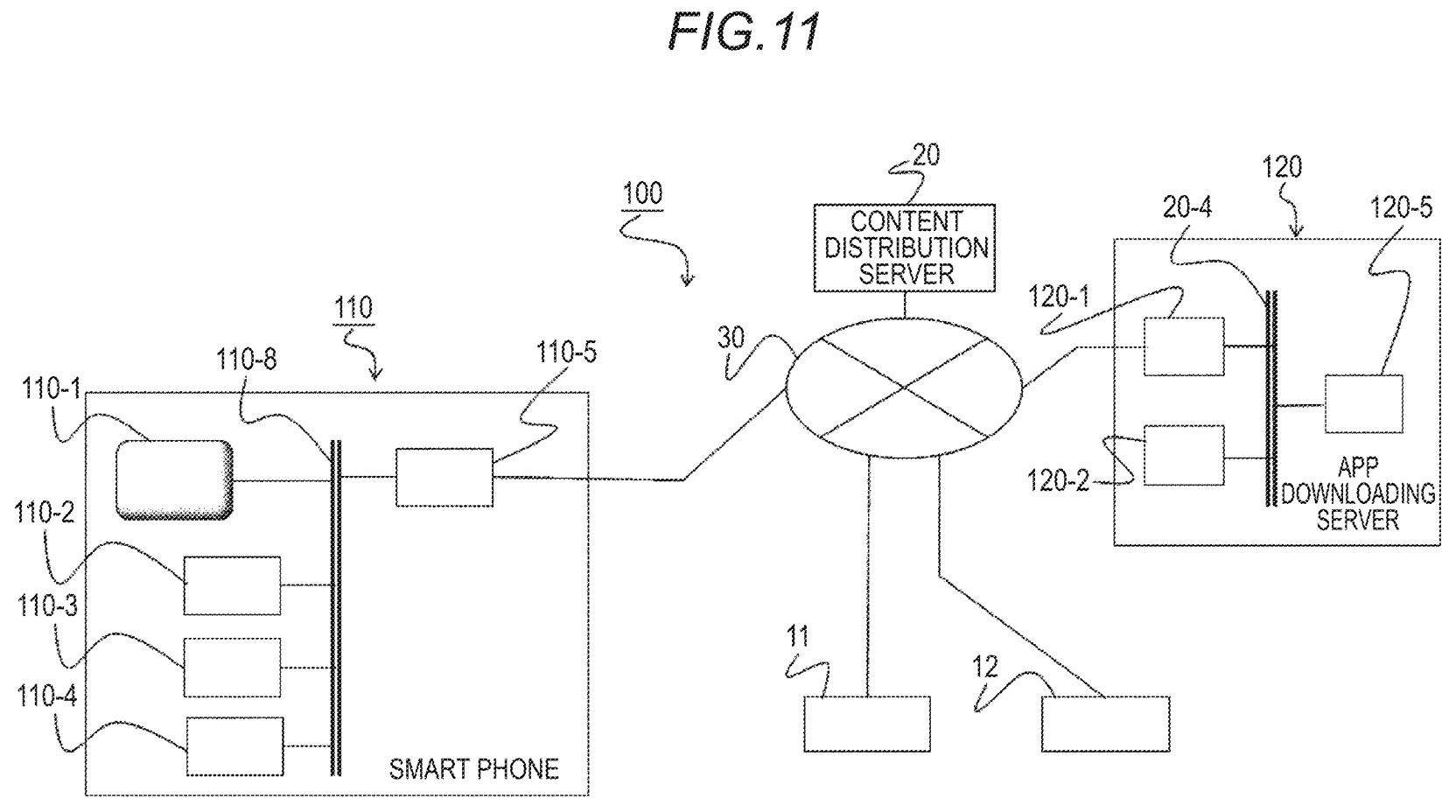

FIG. 11 is a configuration diagram of a content distribution and reception system that is a fourth embodiment according to the invention.

Figure 12:
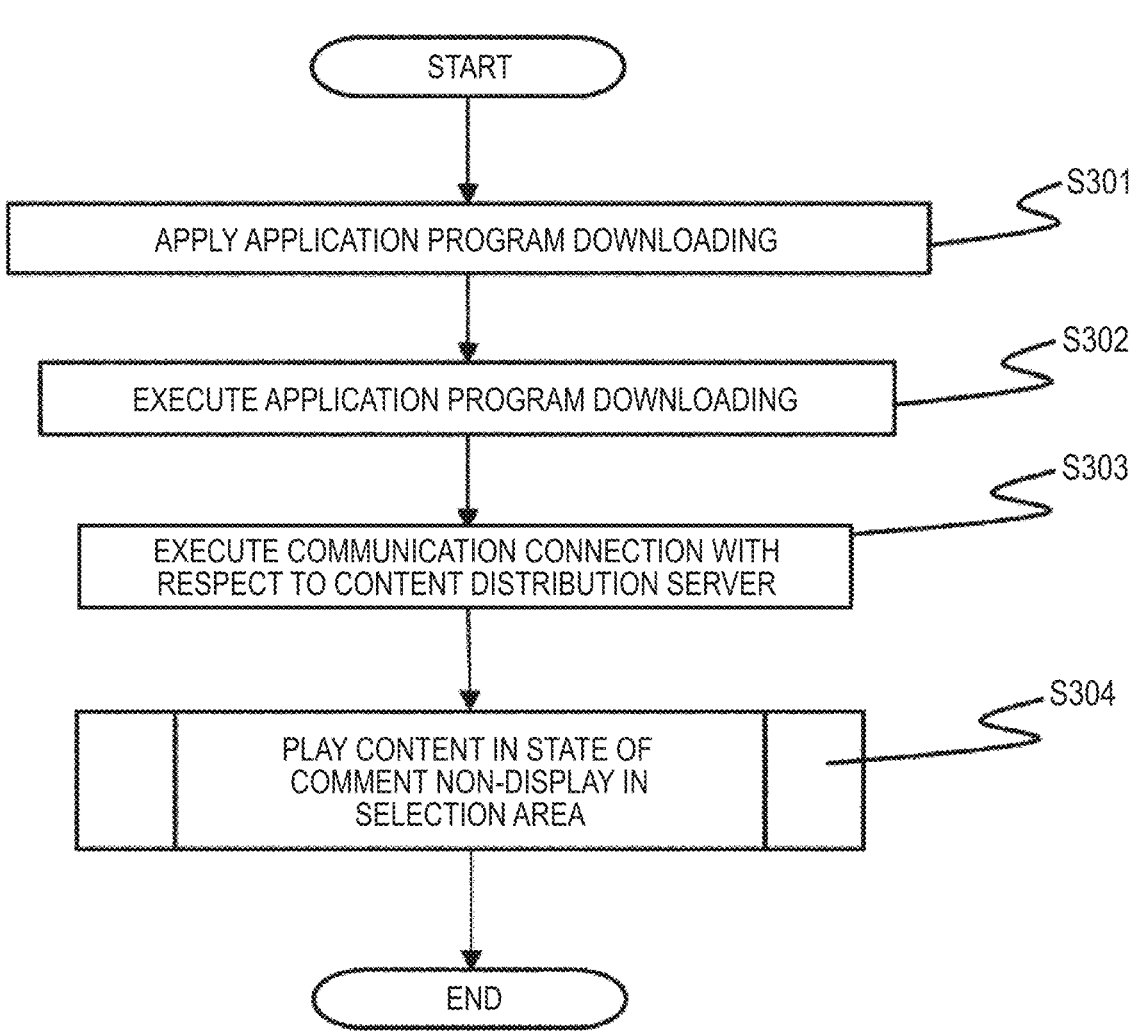

FIG. 12 is a flowchart illustrating an operation of the system illustrated in FIG. 11.

Figure 13:
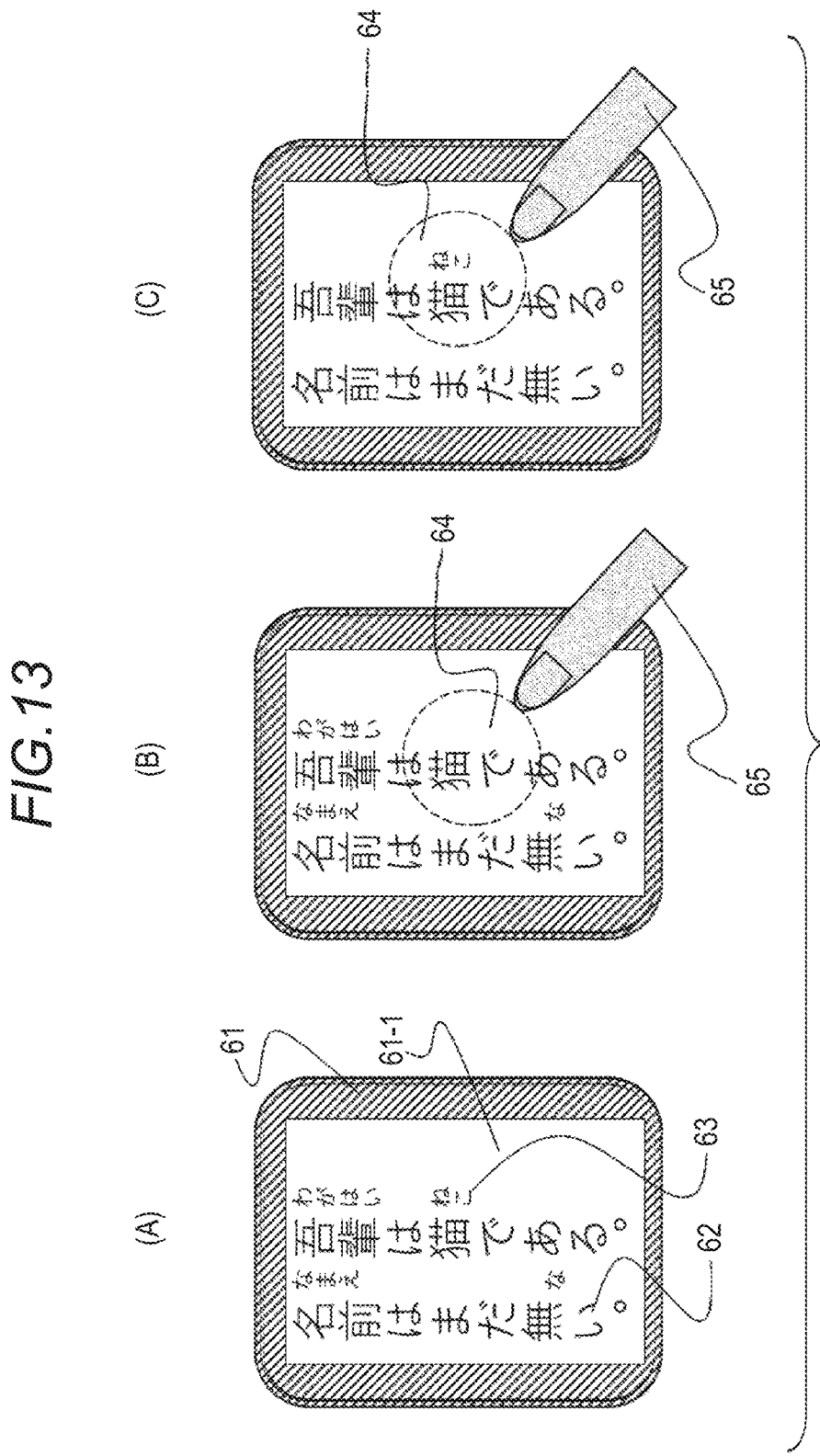

FIG. 13 is a schematic view for describing an operation of an electronic book reader according to the invention.

Figure 14:
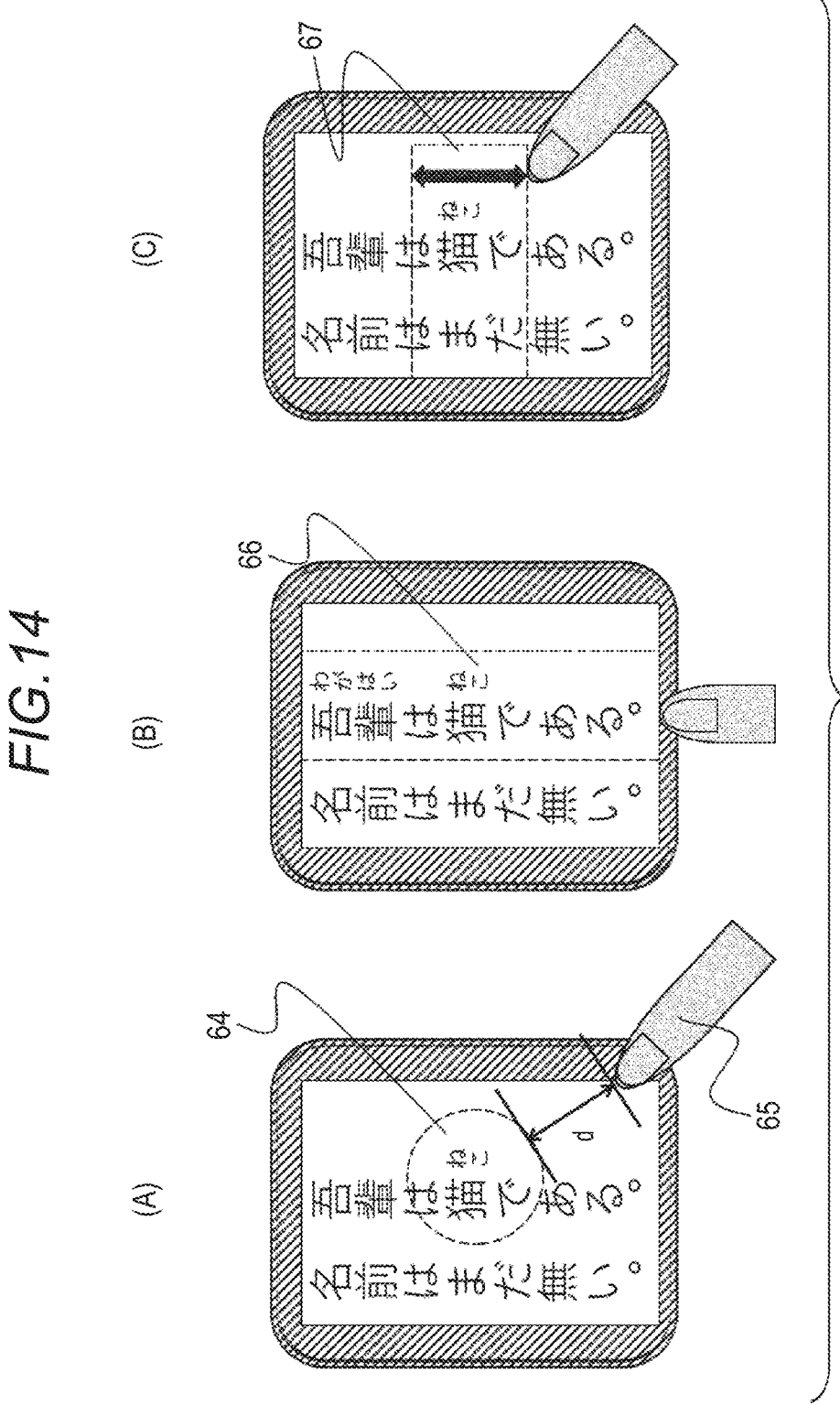

FIG. 14 is a schematic view for describing the operation of the electronic book reader according to the invention.

DETAILED DESCRIPTION

First Embodiment~ Content Distribution and Reception System

Hereinafter, a content distribution and reception system 1 that is a first embodiment according to the invention will be described with reference to FIG. 1 to FIG. 8.

Note that, each example described herein is merely an example for implementing the invention and is not limited to this embodiment, but various modifications and combinations with other technologies can be made and are also included in the invention.

In addition, the configuration of each embodiment described below may be collectively provided in any one of a single server or a plurality of servers provided in a server system that is an embodiment of the invention, or may be dispersedly provided in the plurality of servers provided therein.

Figure 1:
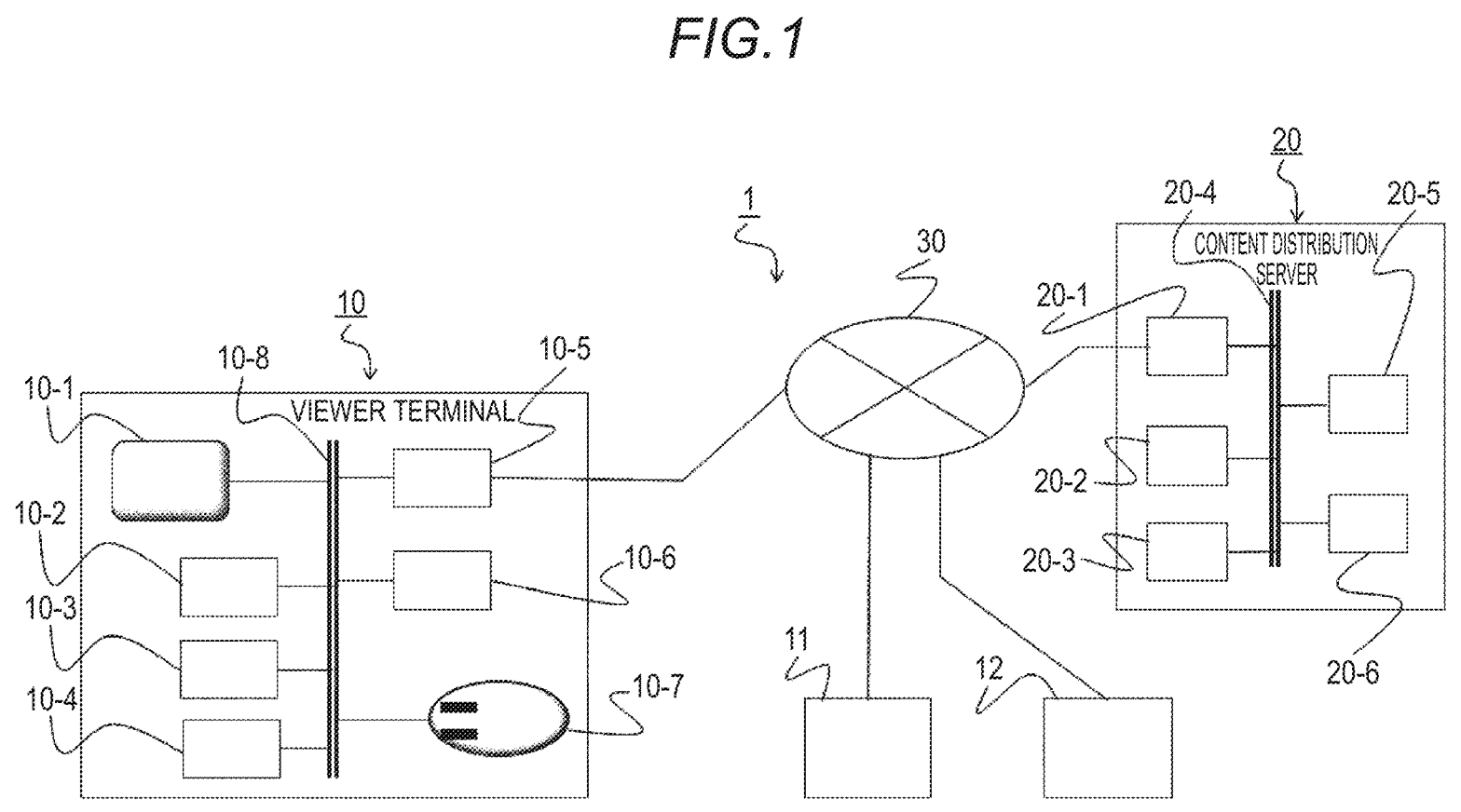

As illustrated in a schematic view of a configuration of FIG. 1, the outline of a content distribution and reception system 1 according to this embodiment, a content (a broadcasting program of a moving image) is stored in advance to a server 20, and the content is distributed to a viewer terminal 10 in accordance with a request from the viewer terminal 10, and is provided for playing and viewing.

The content (the broadcasting program) may be a moving image, a still image, or a combination thereof, the contents may be any one of a photographed broadcasting program, an animation broadcasting program, and a virtual CG image of computer graphics (a 2D space, a 2.5D space, and a 3D space), or may be a broadcasting program of a combination thereof. In addition, the content may be a broadcasting program that is produced by an operator, or a content poster may post in advance the content to the operator and the posted content may be distributed to each of the viewer terminals from the operator.

In addition, the content may be data that is recorded and stored in advance, or may be so-called "live broadcast" that is a content to be distributed from a distributor in real time. Note that, in the following description, for the sake of convenience, a case where the content or the corresponding comment is stored in advance in the server 20 will be mainly described, but in a case where the content is the live broadcast, the content is distributed to each of the viewer terminals a from distributor terminal (described below) that is not illustrated through the server 20, a comment is posted to the server 20 from the viewer terminal viewing the distributed content, and the posted comment is also distributed to each of the viewer terminals from the server 20, and thus, a viewer viewing a live broadcast content is capable of viewing the comment that is posted to each scene in real time while viewing the content in real time.

FIG. 1 is a diagram schematically illustrating the configuration of the content distribution and reception system according to the invention.

Specifically, this system 1 includes the viewer terminal 10, the server 20, other viewer terminals 11 and 12 having the same configuration as that of the viewer terminal 10, and an internet communication network 30 connecting each of the terminals 10, 11, and 12 and the server 20 such that data exchange can be performed. Note that, the internet communication network 30 can also be communication networks of other modes, for example, a local area network (LAN) line, a wide area network (WAN) line other than the internet communication network.

The viewer terminal 10 is a terminal that is preferably attained by a personal computer or a personal digital assistant (PDA), and includes a display panel 10-1 that is attained by a liquid crystal (LCD) display panel or the like, a display control unit 10-2 that is a logic circuit configuration for performing display control of the display panel 10-1, a memory 10-3 including a read only memory (ROM) and a random access memory (RAM) recording various control programs (firmware) of the viewer terminal 20, information of the content and the comment distributed from the server 20, and the like, a control unit 10-4 that is a central processing unit (CPU) performing the control of each unit of the viewer terminal 10, on the basis of the control program recorded in advance, an input/output interface 10-5 that is an interface for performing data transmission and reception between the viewer terminal 10 and the outside, a keyboard 10-6 in which data input can be performed in accordance with the manipulation of a manipulator, a mouse 10-7 that is a tool for the manipulator to perform pointing by moving a mouse cursor display 10-9 that is displayed on a screen of the display panel 10-1, and a data bus line 10-8 connecting each unit of the viewer terminal 10 such that data exchange can be performed.

Note that, a chip set performing data transmission control between the control unit 10-4 and each part inside and outside the viewer terminal 10 may be used instead of the data bus line 10-8.

In addition, similarly, the server 20 illustrated in FIG. 1 includes an input/output interface 20-1 that is an interface for performing data transmission and reception with respect to the outside, a content storage unit 20-2 recording the content (the broadcasting program) such that the content can be distributed to the outside, a comment recording unit 20-3 recording the posted comment that is accepted from the viewer viewing the content, together with information of a posted play time to be distributed to an external terminal, in accordance with a request, a data bus line 20-4 connecting each unit of the server 20 such that data transmission and reception can be performed, and a control unit 20-5 that is a central processing unit (CPU) performing control of each unit of the server 20, on the basis of a control program recorded in advance.

Similarly, a chip set performing data transmission control between the control unit 20-5 and each part inside and outside the server 20 may be used instead of the data bus line 20-4.

Further, as described below, the server 20 includes a download program recording unit 20-6 that records and stores JavaScript (Registered Trademark) that is a program for performing control such that the comment is set to non-display in a specific selection area on a content display screen, or similarly, a PDA application program (a so-called "app") for performing the control such that the comment is set to the non-display in the specific selection area on the content display screen to be downloadable.

Note that, the download program recording unit 20-6 or the like may be provided in servers other than the server 20 recording the content or the comment.

That is, it can be also considered that in the server system including a single server or a plurality of servers, each configuration such as the content storage unit 20-2 recording the content (the broadcasting program) such that the content can be distributed to the outside, the comment recording unit 20-3 recording the posted comment that is accepted from the viewer viewing the content, together with the information of the posted play time to be distributed to the external terminal, in accordance with the request, and the download program recording unit 20-6 that records and stores JavaScript that is the program for performing the control such that the comment is set to the non-display in the specific selection area on the content display screen, or similarly, the PDA application program (the so-called "app") for performing the control such that the comment in the specific selection area on the content display screen is set to the non-display to be downloadable, which is the configuration and the function of the server 20, described above, is provided in any one of each of the servers, the servers including each configuration cooperate with each other, and the same function or the same operation as the function or the operation of the server 20 described above or described below is attained.

Next, the configuration and the operation of the viewer terminal 10 will be described.
(Terminal Provided in System)

As described above, data of the content (the broadcasting program) is accumulated in advance in the server 20 or a server having a content distribution function, and is distributed to the viewer terminal 10 from the server, and thus, the content is played.

However, there is a person producing the content (the broadcasting program) (referred to as a "distributor"), the distributor posts the own produced content to the server 20 or the like from a personal computer referred to as the distributor terminal, and the server 20 or the like distributes the content to each of the viewer terminals 10, 11, and 12 used by a viewing user, and the distributor terminal to be provided for viewing and playing.

In addition, the comment with respect to the content can be posted with respect to the server 20 or the like from the distributor terminal and the viewer terminal 10, that is, at least one of all terminals provided in this system 1. In addition, a terminal that is a viewer terminal but does not have a qualification for enabling the comment not to be posted to the server 20 or the like can also be provided.

On the other hand, a manipulation for changing a display mode of the comment that is displayed in synchronization with the play of the content with the manipulation of a mouse or the like can be performed by any one of each of the viewer terminals 10, 11, and 12, the distributor terminal, and the viewer terminal not having the qualification for posting the comment, described above. Therefore, in the following description, the configuration and the operation of the viewer terminal 10 will be described as a representative example, and the operation is the same in both of the distributor terminal and the viewer terminal not having the qualification for posting the comment.
(Configuration and Operation of Viewer Terminal 10)

Figure 2:
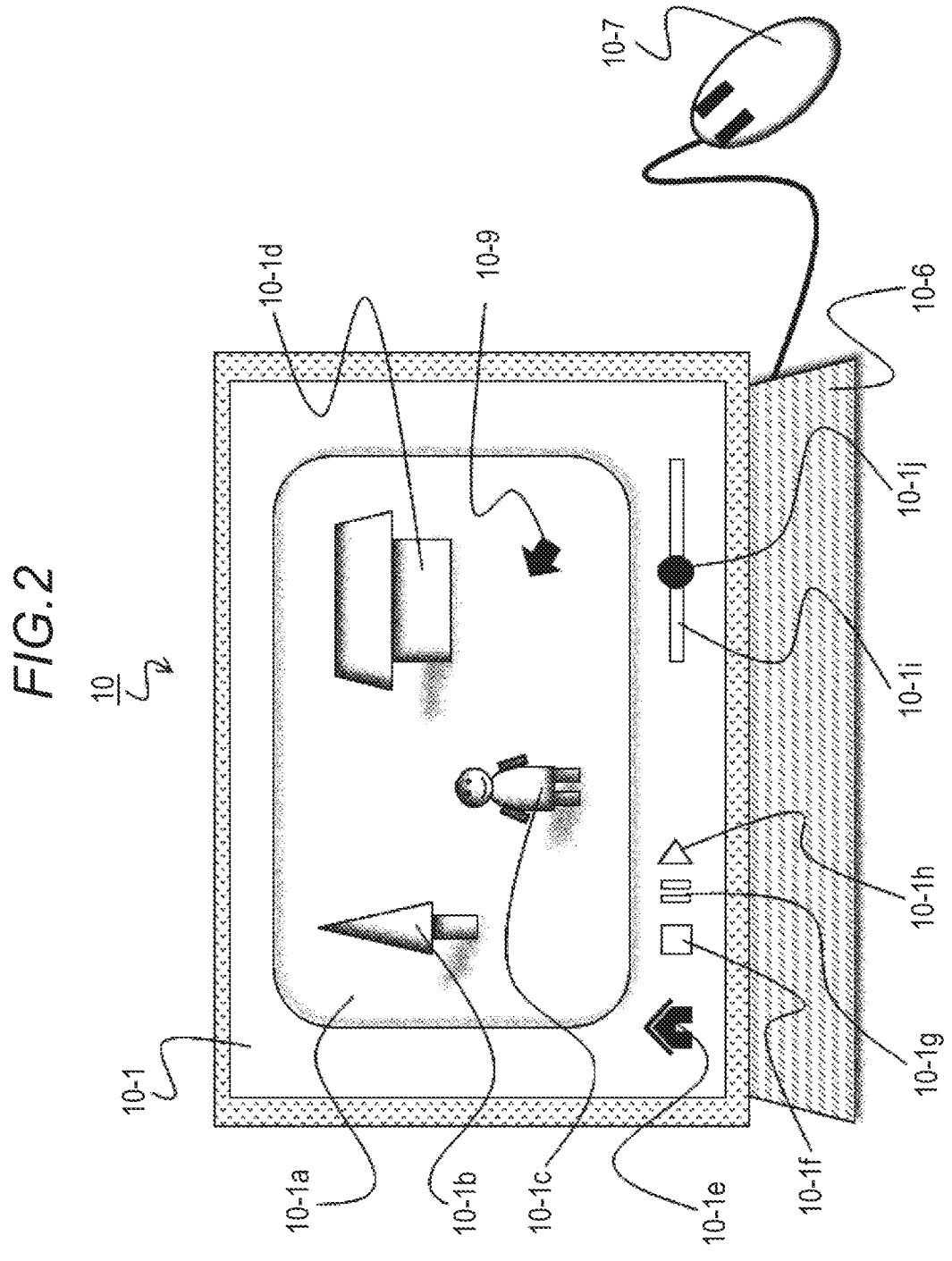
FIG. 2 is a diagram schematically illustrating an appearance and a configuration of a viewer terminal provided in the content distribution and reception system of FIG. 1.

FIG. 2 is a diagram schematically illustrating the appearance and the configuration of the viewer terminal provided in the content distribution and reception system of FIG. 1.

In FIG. 2 schematically illustrating the appearance of the viewer terminal 10, the viewer terminal 10 includes the display panel 10-1, and a content display screen 10-1$a$ is displayed on the display screen. The viewer knows information of a uniform resource locator (URL) for connection with respect to the server 20 by means such as search, in order to play the content, and in a case where the viewer performs connection with respect to the server 20 by a known method, a portal screen (not illustrated) of a content distribution service that is provided by the server 20 is displayed to the viewer terminal 10, in accordance with data transmission from the server 20. The viewer selects a content that the viewer wants to watch by performing a selection manipulation on the portal screen, and plays the content. Note that, a so-called portal server that transmits information for displaying the portal screen may be a server different from the server 20 described above.

FIG. 2 illustrates a situation in which the content is played as described above, and for description, the display of the comment is omitted.

That is, in the viewer terminal 10 of FIG. 2, the content display screen 10-1$a$ that is provided by the content distribution service appears in the display screen of the display panel 10-1, and a display 10-1$b$ of a tree, a display 10-1$c$ of a person, and a display 10-1$d$ of a house appear in the screen.

In addition, a home button display 10-1$e$ for returning to the portal screen of the content distribution service, a stop button display 10-1$f$ for ending the play of the content, a pause button display 10-1$g$ for pausing the play of the content to allow a still image display remain as it is, a play button display 10-1$h$ for starting the play of the content or restarting the play that is being paused, a seek bar display 10-11 that is an indicator for indicating the current play time in the position of a seek button display 10-1$j$ by indicating a play start time of the content on a left end and by indicating a play end time on a right end, and the seek button display 10-1$j$ for performing a change manipulation with respect to the position of the play time by indicating the play time and by moving the play time with a cursor appear in the screen of the display panel 10-1.

Figure 3:
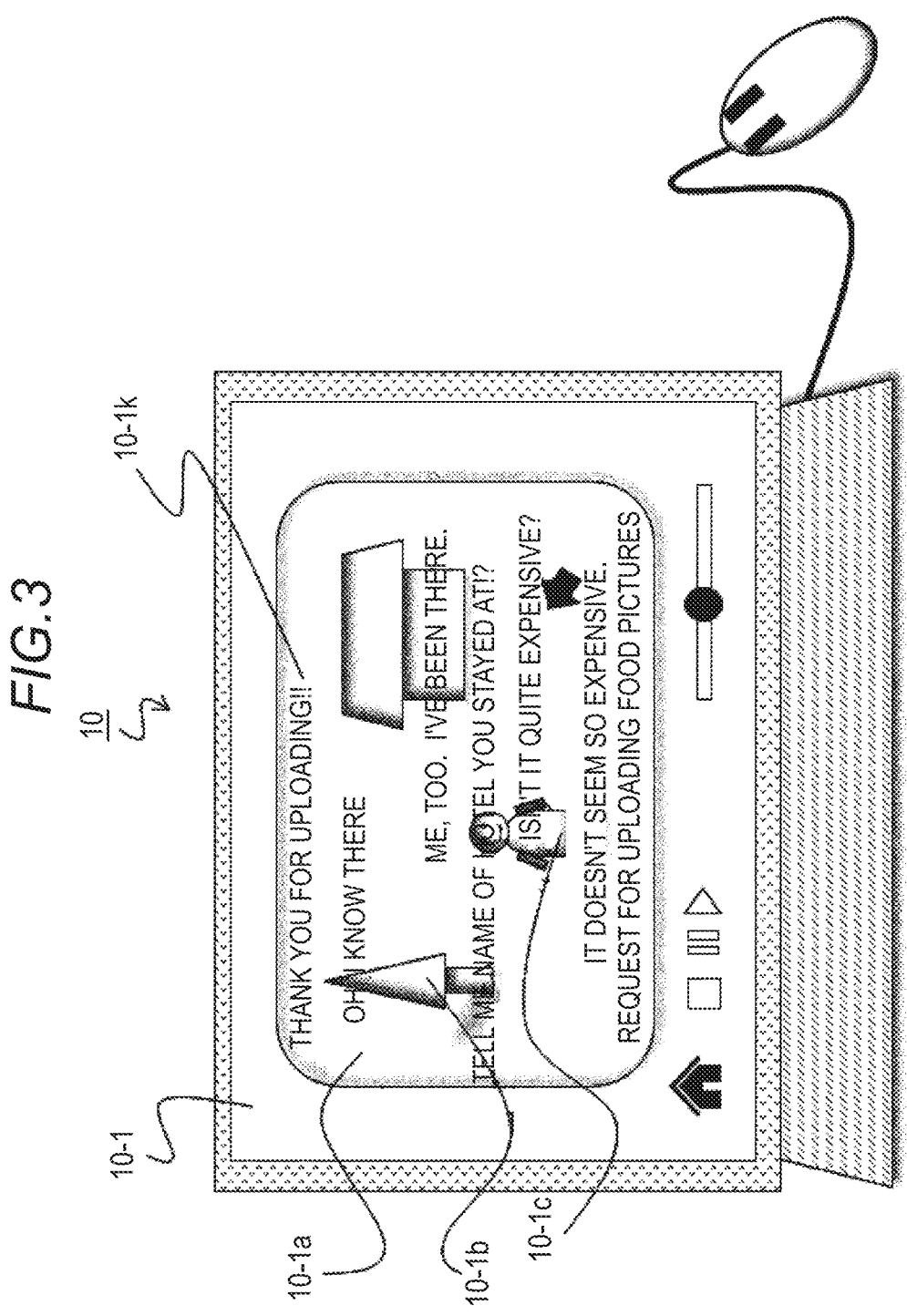
FIG. 3 is a diagram schematically illustrating the appearance and the configuration of the viewer terminal provided in the content distribution and reception system of FIG. 1.

FIG. 3 is a diagram schematically illustrating the appearance and the configuration of the viewer terminal provided in the content distribution and reception system of FIG. 1.

In addition to the situation illustrated in FIG. 2, FIG. 3 illustrates that a comment 10-1$k$ is displayed on the content display screen 10-1$a$, and examples of the comment 10-1$k$ are message contents with respect to the contents of a content assuming a recording video of travel, such as "Thank you for uploading!!", "Oh, I know there", "Me, too.", "I've been there.", "Tell me the name of the hotel you stayed at!?", "Isn't it quite expensive?", "It doesn't seem so expensive.", and "Request for uploading food pictures".

Each of the comments 10-1$k$ is displayed on the content display screen at the play time of the content to which the comment is posted by the comment poster. Accordingly, the viewer who will watch the posted comment later views the scene of the content of an object to which the comment is posted by the comment poster, together with the posted comment, and thus, is capable of sufficiently understanding a relationship between the meaning of the comment or the scene of the content and the comment.

Note that, in a case where the content is play broadcast, for example, the comment posted with respect to a screen after 60 seconds from the start of the content is also superimposed on a screen after 60 seconds from the start when the same content is played by the other viewer at a later day, and is displayed on the terminal of the viewer. On the other hand, in a case where the content is live broadcast, for example, the comment posted with respect to a screen after 60 seconds from the start of the live broadcast is displayed on a content display screen of the other viewer viewing a live broadcast content substantially in real time, that is, in a moment, and thus, the comment superimposed on a screen at 60 seconds after the start of the live broadcast content can also be visually recognized by the other viewer.

In addition, each of the comments 10-1$k$ is displayed by overlapping with (by being superimposed on) the content display screen 10-1$a$, and the display range is larger than the range of the content display screen 10-1$a$. This is because it is easy for the viewer to distinguish the comment 10-1$k$ from the content posted by an image poster. In addition, each of the comments 10-1$k$ is displayed to appear from the right end of the display panel 10-1, to be gradually moved (scrolled) to the left, and to sequentially disappear to the left end.

In the situation illustrated in FIG. 3, each of the comments 10-1$k$ is displayed by overlapping (by being covered) with a display object of the content, such as the display 10-1$b$ of the tree, the display 10-1$c$ of the person, and the display 10-1$d$ of the house. In such a state, all of the comments 10-1$k$ are displayed, and as illustrated in FIG. 3, the display can be performed by the selection of the viewer, but in a case where the viewer wants to closely watch the display 10-1$c$ of the person, there is a concern that the comment that is displayed by overlapping (by being covered) with the display becomes an obstruction.

FIG. 4 is a diagram schematically illustrating the appearance and the configuration of the viewer terminal provided in the content distribution and reception system of FIG. 1.

FIG. 4 illustrates a situation in which a characteristic function of the invention is exhibited in order to satisfy such an intention of the viewer, and the display 10-1$c$ of the person is surrounded by an area around a position subjected to the selection manipulation by the viewer moving a display 10-9 of the mouse cursor (a circle in the example of FIG. 4) or an area 10-1$m$ specified by a rule set in advance, and the comment 10-1$k$ is set to the non-display in the area 10-1$m$, thus, and the viewer is capable of clearly viewing the display 10-1$c$ of the person. In addition, each of the comments 10-1$k$ is displayed outside the range of the area 10-1$m$ subjected to the selection manipulation, as before, and as described above, each of the comments 10-1$k$ is subjected to scroll display to flow to the left from the right, and thus, the viewer does not have a great difficulty in reading the message contents of each of the comments 10-1$k$.

Note that, a period in which the result of selecting the area 10-1$m$ is effective may be a period until the viewer logs out of the distribution service, or in the case of planning to set the comment to the non-display by setting the result to be effective, for example, for 5 seconds after the selection, a selection action may be performed again. In addition, such an effective period of the selection may be set by default in the system, or may be set such that the viewer is capable of performing the selection.

That is, this system 1 selects a specific range in the display screen, and during the period in which the selection is effective, and allows the display mode of the comment inside and outside the selected range to be different, in the viewer terminal 10, and as a result thereof, the viewer terminal 10 is capable of attaining the display mode illustrated in FIG. 4, and thus, clear viewing of an object that the viewer wants (the display 10-1$c$ of the person) and the viewing of each of the comments 10-1$k$ with less difficulty can be compatible.

Next, the description will be made by using FIG. 5 that is a schematic view for generating an image of one frame displaying a specific operation when this system 1 exhibits the function illustrated in FIG. 4, and FIG. 7 that is a flowchart summarizing the relevant operations by focusing on the operation of the viewer terminal 10. Note that, the details of a subject performing each operation or the relevant configuration are described in each of the configurations of this system 1 described above, and thus, the repeated description will be avoided.

Figure 5:
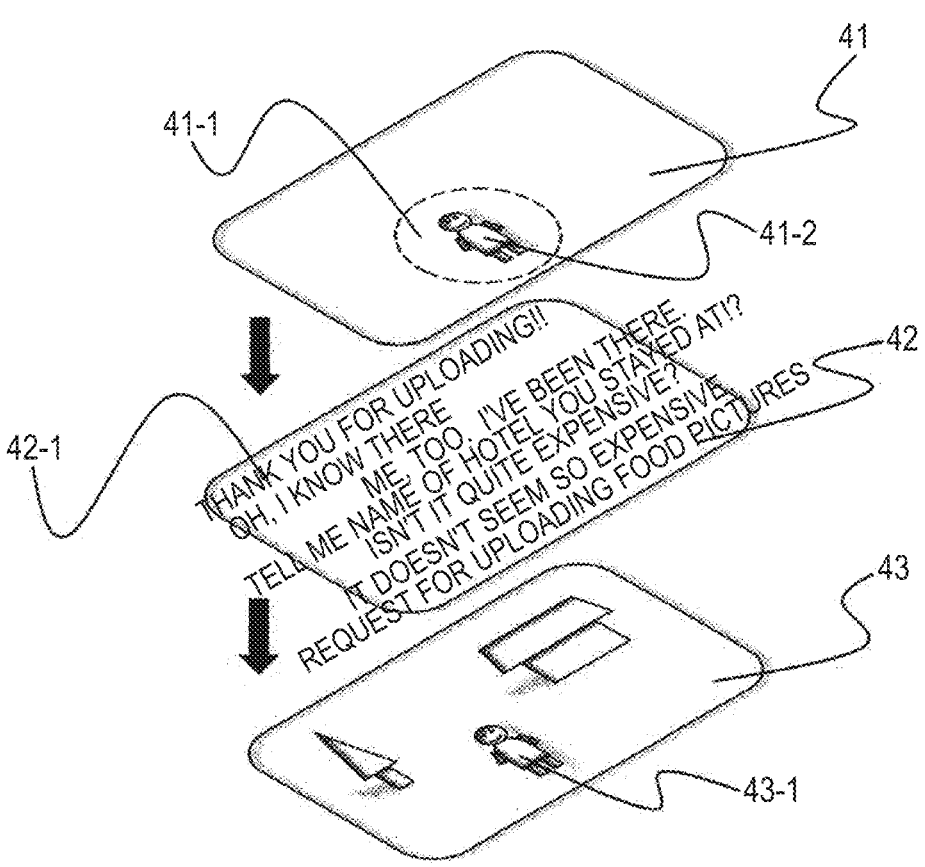
FIG. 5 is a diagram schematically illustrating an operation principle of the viewer terminal illustrated in FIG. 4.

FIG. 5 is a diagram schematically illustrating an operation principle of the viewer terminal illustrated in FIG. 4.

FIG. 7 is a flowchart describing the operation of the viewer terminal in the content distribution and reception system that is the first embodiment according to the invention.

First, the data of the content that is selected by the viewer and the data of the comment that is posted with respect to the content are transmitted to the viewer terminal 10 from the server 20 (step S101). In this example, the content is a video, and thus, data of one frame (one image in the video) is continuously generated and is displayed respectively, and therefore, a moving image is displayed on the display panel 10-1. Therefore, first, one frame of a content layer 43 for displaying the video is generated (step S102). As illustrated in FIG. 5, the content layer 43 includes a display 43-1 of a person that the viewer particularly wants to view.

Next, similarly, a comment layer 42 for displaying all comments to be displayed by being superimposed on the video is generated from the transmitted comment data (step S103). As described above, each of the comments is recorded together with the information of the play time of the content to which the comment is posted, and is transmitted to the viewer terminal 10, and thus, the content layer 43 and the comment layer 42 for performing display corresponding to the content layer can be synchronously generated. Then, the comment layer 42 is superimposed on the content layer 43 (step S104).

The comment layer 42 includes a letter string such as a comment 42-1, and transparent attribute is applied to an area not having the comment 42-1. Therefore, in a case where the comment layer 42 is superimposed on the content layer 43, the comment 42-1 is displayed on the moving image by covering the moving image, and in a position without the comment 42-1, the moving image can be directly visually recognized through the transparent comment layer 42. That is, the viewer is capable of watching the moving image under the comment 42-1.

The viewer is capable of selecting an area in which the viewer does not want to display the comment, in the current display screen, by using the mouse 10-7, and the control unit 10-4 determines whether or not the area is selected by using such a pointing device (step S105).

In a case where the result of step S105 is NO, the superimposed layer is directly displayed as an image of one frame (step S108), it is checked whether or not the play of the content comes to the end, the pause button is pressed, or the play of the content is stopped, and thus, the display of the next frame is banned (step S109). In a case where the display of the next frame is banned, a series of content display is ended, and in a case where the display of the next frame is not banned, the process returns to step S102, and the next frame is generated and displayed. As a result thereof, screen display (play) of a moving image content is performed.

In step S105, in a case where the area is selected, as illustrated in FIG. 5, a layer 41 including a content display area 41-1 obtained by cutting out the selected area is generated (step S106).

In the layer 41, the selected area 41-1 includes the display 41-2 of the person that the viewer wants to watch, whereas, the outside of the area 41-1 has the transparent attribute.

The superimposed layer generated in step S106 is further superimposed on the superimposed layer generated in step S104 (step S107). As a result thereof, as with the display illustrated in FIG. 4, described above, an image for one frame is generated in which the comment is not displayed in the area 10-1m surrounding the display 10-1c of the person, and the comment is displayed outside the area 10-1c, as usual, and the image for one frame is displayed (step S108). After that, the same processing is performed through the determination of step S109.

An operation involved in generating each frame of the image described above is attained by transmitting and recording a control program described in JavaScript that describes control as described above to the viewer terminal 10 from the server 20, or the other server having a distribution function of the control program described in JavaScript, together with the content data and the comment data or independently from the data, and by executing the control program when the viewer terminal 10 performs display.

The processing is performed as described above, and thus, the viewer is capable of clearly viewing the display 10-1c of the person that the viewer wants to watch without an obstruction, whereas the comment 10-1k, for example, is subjected to the scroll display from the screen right side to the left side outside the area 10-1m, and thus, each portion of the comment 10-1k definitely appears once in the display in the display panel 10-1, and therefore, an effect that there is no great trouble in viewing the message of the comment can be obtained.

Second Embodiment~Content Distribution and Reception System

Next, another embodiment in which the same content distribution and reception system is used but the details of an operation for generating a content image frame are different will be described by mainly using FIG. 6 and FIG. 8. Note that, the respects that are not mentioned are same as those of the system 1 according to the embodiment described above.

FIG. 6 is a diagram schematically illustrating the operation principle of the viewer terminal illustrated in FIG. 4.

FIG. 8 is a flowchart describing the operation of the viewer terminal in the content distribution and reception system that is the first embodiment according to the invention.

As illustrated in FIG. 6 that is a schematic view for generating a frame in this embodiment, and similarly, FIG. 8 that is a flowchart illustrating a process for generating the frame, the content data and the comment data are distributed to the viewer terminal 10 from the server 20 (step S201), the content layer is generated (step S202), and the comment layer is generated (step S203).

Next, it is determined whether or not the viewer selects an area (step S204), and in a case where the area is not selected, the comment layer is superimposed on the content layer, and as illustrated in FIG. 3 described above, an image overlapping (covered) with all of the comments are displayed on the entire screen of the content.

In a case where the area is selected in step S204, modification is performed such that the comment is not displayed in a selected area 51-2 in a generated comment layer 51 (step S205).

Specifically, for example, in attribute "mask" that is described in JavaScript, a uniform resource locator (URL) of an image in which only a central round region that is entirely opaque is set to be transparent is designated, the URL is received, and a browser program performs control such that only a portion in which the image of the mask is opaque at the time of being displayed by a browser, that is, only an image of the comment layer 51 outside the selected area 51-2 is displayed on the screen, and thus, the comment is not displayed in the selected area 51-2 in the generated comment layer 51.

Then, the comment layer 51 modified such that the comment is not displayed in the selected area 51-2 is superimposed on the content layer 52 (step S206).

As a result thereof, in the modified comment layer 51, the inside of the area 51-2 is transparent and there is no comment in the area 51-2, and in the content layer 52 underlaid with the area 51-2, a display 52-1 of a person is displayed without being covered with the comment, and the content image is covered with the comment outside the area 51-2, as before.

Note that, the other method for setting the comment not to be displayed in the selected area 51-2 may be a method for alternately repeating an operation for "drawing a video image" and an operation for "drawing a comment outside the area 51-2" every fixed time, without using superimposed layers as with two examples described above.

Needless to say, the effects of the system of this embodiment are same as those of the first embodiment described above.

Third Embodiment~ Content Distribution and Reception System

In the first embodiment and the second embodiment described above, it has been described that the characteristic operations as with the flowchart illustrated in FIG. 7 and FIG. 8 are attained by executing JavaScript distributed to the viewer terminal 10 that is preferably attained by a personal computer from the server 20.

However, as described above, the viewer terminal 10 is not limited to the exemplified personal computer, and can also be attained by a portable information terminal (PDA) including a smart phone. However, an embodiment is desirable in which a manipulation for selecting the area 51-2 as a moving image display area in which the comment is not displayed is changed to a manipulation method suitable for PDA from the mouse pointer 10-7 used in the personal computer.

Therefore, a mode in which the viewer terminal 10 is attained by a smart phone 9 will be described as a third embodiment.

The general-purpose smart phone 9 is used as the viewer terminal in this embodiment, the viewer terminal is connected to the site of a moving image distribution service known in advance, on the basis of information or the like of a uniform resource locator (URL) thereof, and hereinafter, the moving image content, the comment, and the like are displayed as with the embodiment of the personal computer that is described above by using FIG. 2, FIG. 3, or the like.

FIG. 9 is a schematic view of the appearance of the smart phone in the content distribution and reception system that is the third embodiment according to the invention.

FIG. 9 schematically illustrates the appearance of the smart phone 9 that is connected to the moving image distribution service as described above, and thus, in a display panel 9-1, a content display screen 9-3 and a comment 9-2 are displayed, in the content display screen 9-3, a selected area 9-4 is provided by a manipulation described below, and in the area 9-4, a display 9-5 of a person is drawn to be visually recognizable but the comment 9-2 is not displayed.

FIG. 10 is a schematic view illustrating an example of a manipulation using the smart phone illustrated in FIG. 9.

FIG. 10 illustrates a plurality of manipulations for a manipulator to select the selected area 9-4 in this embodiment, as an example. Note that, the manipulation can be implemented without being limited to the example, and all of the manipulations are included in the scope of the invention.

That is, FIG. 10(A) illustrates a tapping manipulation in which the display 9-5 of the person that is an object that the manipulator wants to closely visually recognize is directly touched with a finger 9-6 of the manipulator. In a case where the tapping manipulation is performed, a circular area in a certain range around the display 9-5 of the person is the selected area 9-4, and in the area 9-4, the comment 9-2 is not displayed. Note that, the shape of the area is not limited to the circular shape described above as an example, and may be other shapes, or the shape may be capable of being selected from shapes provided in advance or may be capable of being arbitrarily set. Such a respect is common in each of the examples herein.

In addition, FIG. 10(B) illustrates that the same tapping manipulation is used, but an area having a predetermined area at a predetermined distance in the head of the finger 9-6 is selected, and thus, the disappearance of the display 9-5 of the person by being hidden with the finger 9-6 does not occur.

In addition, FIG. 10(C) illustrates a pinching manipulation for interposing a desired area between two fingers 9-6, and the pinched area is the selected area 9-4.

Further, FIG. 10(D) is a diagram illustrating a swipe manipulation for the finger 9-6 to slide and move in a certain range in the screen 9-3, and a manipulation for setting a predetermined circular area to be included in the range in which the finger 9-6 slides and moves, as the selected area 9-4, is performed.

In addition, a selection method can be used by being suitably selected from all manipulation methods that are used in touch sensor type display panel of various PDAs including a smart phone.

Fourth Embodiment—Content Distribution and Reception System Using Smart Phone App In the content distribution server according to the third embodiment described above, the smart phone 9 is used as the viewer terminal, but the operation thereof has many common points with the configuration and the operation of the content distribution and reception system 1 described in the first embodiment, in which the personal computer is mainly used as the viewer terminal 10.

On the other hand, a configuration and a operation may be used in which a smart phone is similarly used as the viewer terminal, but a dedicated application program (hereinafter, also referred to as an "app" in accordance with a general name) for viewing the content distribution service is downloaded in advance to be installed in the smart phone, and is used for the subsequent viewing.

However, in a smart phone app, there are many apps of which the contents are a browser itself in spite of being a dedicated app for executing a certain task, and such apps are also commonly referred to as a "side native app", a "hybrid app", and the like.

In the smart phone app of this embodiment, as described in each of the examples, a function for attaining the characteristic operation of the invention in which the display mode of the comment inside and outside the selection area is different is mounted an app body, unlike such a side native app. That is, in the embodiments described above, a JavaScript execution program that is transmitted from the server, together with the video, has such a function, whereas in this embodiment, the function in which the display mode of the comment inside and outside the selection area is different is described in the app itself that is downloaded in advance in the smart phone.

A content distribution and reception system 100 using such a smart phone app will be described mainly with reference to FIG. 11 and FIG. 12.

FIG. 11 is a configuration diagram of the content distribution and reception system that is the fourth embodiment according to the invention.

FIG. 12 is a flowchart illustrating the operation of the system illustrated in FIG. 11.

The content distribution and reception system 100 using the smart phone app according to this embodiment includes a content distribution server 20, a smart phone 110, and an app downloading server (an application program distribution server) 120, and such units are connected to each other through a communication path represented by the internet communication 30 network such that data transmission and reception can be performed. In addition, the other viewer terminals 11 and 12 for the other user to view the content are included in the system 100.

The smart phone 110 includes a display panel 110-1 that is attained by a liquid crystal (LCD) display panel or the like, a display control unit 110-2 that is a logic circuit configuration for performing display control of the display panel 110-1, and a memory 110-3 including a read only memory (ROM) and a random access memory (RAM) recording various control programs (firmware) of the smart phone 110, various application programs (apps) downloaded from the app downloading server 120, and information of the content and the comment distributed from the content distribution server 20, and the like.

In addition, the smart phone 110 includes a control unit 110-4 that is a central processing unit (CPU) performing control of each unit of the smart phone 110, on the basis of the control program recorded in advance, an input/output interface 110-5 that is an interface for performing data transmission and reception between the smart phone 110 and the outside, and a data bus line 110-8 connecting each unit of the viewer terminal 10 such that data exchange can be performed.

Note that, a chip set performing data transmission control between the control unit 110-4 and each part inside and outside the smart phone 110 may be used instead of the data bus line 110-8.

In addition, similarly, the content distribution server 20 illustrated in FIG. 11 has the same configuration as that of the content distribution server 20 included in the content distribution and reception system 1 described in the first embodiment described above.

The app downloading server 120 is a server that provides a smart phone application program (a so-called "app") for downloading in accordance with a request from at least the smart phone 110 and the other terminal, and includes an input/output interface 120-1 that is an interface performing data transmission and reception with respect to the outside, a data bus line 120-4 for connecting each unit of the server 120 such that data transmission and reception can be performed, and a control unit 120-5 that is a central processing unit (CPU) performing control of each unit of the server 120, on the basis of a control program recorded in advance.

Similarly, a chip set performing data transmission control between the control unit 120-5 and each part inside and outside the server 120 may be used instead of the data bus line 120-4.

Each of the viewer terminals 11 and 12 has the same configuration as that of the viewer terminal 10 described in the first embodiment described above, or has the same configuration as that of the smart phone 110 of this embodiment.

Next, the operation of this system 100 will be described on the basis of FIG. 12 that is a flowchart illustrating the operation of this system 100.

First, the manipulator who is the user who wants to view the content applies the downloading of the app by being connected to the app downloading server 120 that is capable of downloading a dedicated app of a desired content distribution service, on the basis of uniform resource locator (URL) information or the like prepared in advance, by using the smart phone 110 (step S301).

The server 120 permits the downloading in accordance with the application, and the user executes downloading with respect to the smart phone 110 (step S302). As a result thereof, the dedicated app of the content distribution service is installed in the smart phone 110 of the user.

In a case where the user wants to view the content in the content distribution service, in each of the examples described above, the user accesses such a server for a distribution service, that is, the content distribution server 20, by a general-purpose browser provided in the smart phone 110, bur in this embodiment, the dedicated app installed in advance is activated.

The activated dedicated app directly accesses the distribution server 20 without using the general-purpose browser, and displays the content as a display screen for launching the app, as with FIG. 9 reference in the embodiment described above (step S303).

When the content is displayed, as described in each of the embodiments described above, the comment is not displayed in the selected area (step S304), and thus, the same effects as those described in each of the embodiments are also exhibited in this embodiment, and each operation is executed by the dedicated app without using the general-purpose browser, and therefore, a drawing speed, reliability, manipulativeness, and the like increase.

Fifth Embodiment~ Content Distribution and Reception System

In the system according to the first embodiment to the fourth embodiment described above, the comment was set to the non-display in the area selected by the viewer.

In the implementation of the invention, the invention is not limited thereto, and various effects are obtained by allowing the display mode of the comment inside the area and the display mode of the comment outside the area to be different. A configuration for specific implementation can be easily conjectured from each of the embodiments described above, and thus, in order to avoid complication, the repeated description will be avoided.

Note that, in this embodiment, the following respects are included. That is, a respect that display for setting the mode to be different inside and outside the selected area is the presence or absence of letter information display, the color of the letter information display, the transparency of the letter information display, a letter size of the letter information display, a display change according to the preparation or the correction history of letter information, a display change according to the meaning or the attribute of the letter information, the presence or absence of the display of each of a plurality of letter information items to be displayed overlapping or a display order, display execution of the letter information that is not displayed except for when a manipulation using the area selection unit is executed, the presence or absence of the display with respect to the letter information that is selected in accordance with criteria set in advance from the letter information, and the presence or absence of advertisement display in the specific area, and a respect that the display is a mode obtained by selecting at least one from such a plurality of modes are included in this embodiment.

(Display Execution Outside Area)

First, in a case where the comment is not displayed outside the area, and the comment is displayed inside the area, the viewer reads the comment only in the area that the viewer wants to watch, and thus, the hindrance of the comment with respect to the viewing of the entire content image decreases.

(Change in Display Color, Transparency, and Letter Size)

In addition, similarly, the content and the comment can be displayed in a mode that the viewer wants to set, by allowing the color for displaying the comment inside and outside the area to be different.

Further, a mode for allowing the transparency of the letter string of the comment and the letter size to be different inside and outside the area may be used.

(Display Change According to Comment Posting or Correction History)

In a case where the display mode of the comment as described above is different in accordance with information at a time when the comment is prepared or posted and information of the correction history, an effect that the viewing can be performed in an area in which only the newest comment is selected, or only the oldest comment can be viewed is obtained.

(Display Change According to Comment Attribute)

In a case where display mode is different inside and outside the area as described above, on the basis of the comment attribute, for example, who performs the posting, for example, the viewer is capable of viewing only a comment of a poster that the viewer likes or respects, or a comment of a poster that the viewer does not want to read can be set not to be displayed in a specific area, and as a result thereof, an effect that the viewer does not feel stress is obtained.

(Limitation on Number of Comments to be Displayed and Selection in Overlapping Comments)

In addition, in a case where a plurality of comments overlap with each other, and it is difficult to read each of the comments, the number of overlapping comments may be limited, or only the bottommost (the oldest) comment may be displayed.

(Display of Hidden Comment)

In addition, a so-called "hidden (secret) comment" that is not displayed in general and is displayed only in a case where the selection manipulation is performed by using the area selection unit may be set, and such a comment may be displayed inside the area or outside the area.

(Non-Display of Non-Display Word)

Taboo words for education and religion, words that the viewer does not want to read, and the like are registered in advance in a dictionary, only the words may not be displayed or may be displayed inside the selection area or outside the selection area.

(Substitution with Respect to Advertisement)

In a case where the viewer does not want to read the comment in the selected area but allows advertisement display (banner advertisement or the like) that does not hinder the viewing of the video, a value for commercial use increases, and there is a merit that the user is capable of avoiding the burden of a system usage charge, and thus, such modification may be performed.

(Handling of Posted Comment of Premium Member)

In the content distribution system of a video or the like, there are various ways of system operation such as a system in which anyone is capable of viewing the content for free, a system in which only a paid register is capable of viewing the content, a system in which the content is for free to a certain range (for example, a title and a viewing time) but paid registration is required after that. In a case where some users are a paid registered member (a premium member), and there is a benefit (a premium) that is not provided to a free member, such a benefit can be a motivation for continuously maintaining the paid registration, from the standpoint of such a member. Therefore, it is effective to set the comment to the non-display in the selected area, but to set only the comment posted by the paid registered member (the premium member) such that the comment is not capable of being set to the non-display.

Further, a method may be used in which such a comment that is not capable of being usually set to the non-display can also be set to the non-display in a case where the viewing user responds to the charging or the viewing user itself performs the paid registration.

(Response According to Comment or Evaluation of Poster)

There is a system in which the viewing user performs evaluation with respect to the posted comment or the poster. In such a system, the display mode of the comment inside and outside the selection area may be different in accordance with the evaluation.

For example, in a case where only a comment with high evaluation or a comment of a poster with high evaluation is displayed in the selection area, the viewing user is capable of obtaining information with high reliability from the displayed comment. On the contrary, in a case where only a comment with low evaluation or a comment of a poster with low evaluation is displayed, the viewing user is also capable of receiving unexpected information or unexpected opinion that is rarely seen.

(Translation to Other Languages)

A comment that is originally posted in Japanese may be subjected to machine translation into English or other languages and may be displayed inside or outside the selected area. This is convenient in a case where a video content distribution service that is operated in Japan is used by a foreign viewing user.

(Gradation or Mosaic Processing of Comment)

In a case where the comment is set to the non-display in the selection area, the viewer may not notice the fact that the comment is posted. Therefore, the comment may be subjected to gradation (the contour fits in the surroundings) processing or mosaic processing without being completely set to the non-display. In the mosaic processing, in a case where the mosaic processing is performed in accordance with the surrounding video display data, the moving image naturally fits in the surroundings, and thus, the viewing of the moving image is hardly obstructed.

(Movement of Selection Area)

In a case where the specific area selected by the mouse or the like is not in the same position on the display screen, but the comment display is subjected to the scroll display, for example, in a direction to the left from the right, and according to this, the selection area, for example, is also moved to the left from the right, the user is capable of continuously reading the same comment for a long period of time, and thus, is capable of feeling readableness.

Alternatively, in a case where an object (for example, a person) of a video content that the viewing user closely wants to watch is moved in the display screen, and according to this, the selection area is also moved, manipulative convenience of the viewing user is improved.

On the contrary, in a case where the selection area is in constant movement such as constantly moving upward or a movement direction is changed to a random direction, production amusingness can be obtained.

(Variation with Respect to Shape or Range of Selection Area)

In the above description, an example has been described in which the selection area is circular, but the shape of the selection area is not limited thereto, and may be a rectangular shape, a square shape, an elliptical shape, or an arbitrary shape. In addition, the selection area is configured such that the size gradually increases after the selection, or may be configured such that the size decreases.

In addition, in a case where the mouse is used in the selection of the selection area, for example, a method in which the selection is effective only while a click button of a mouse is pressed, a method in which the selection is effective until the other manipulation (for example, pressing the button again) is performed even after the click button is released, a method in which the selection is effective for a certain period of time after the click button is pressed, and the like are also considered.

In addition, for example, a wide range of selection such as the upper half and the right half of the display screen may be performed instead of the selection area having a specific shape. Further, the size of the selection area is not constant, but the area may gradually increase after the selection, and thus, a production effect may be increased.

In addition, as another mode, a comment that is not displayed in normal content viewing (a so-called "secret comment") may be displayed in the selected area, or words that the user does not want to display, for example, words with negative meaning, words that should not be read by children, and the like may not be displayed in the selected area.

In addition, the advertisement may be displayed first in the area by selecting the area, or on the contrary, the advertisement may be displayed outside the selected area not to be displayed inside the area.

In addition, in the content distribution service, in a case where a comment of a so-called premium member who is a user with a paid account or a user with a higher charge than usual, unlike an ordinary member, is given preferential treatment, and is continuously displayed even in the selected area, unlike a comment of the other user that is set to the non-display, this can be utilized as an incentive with respect to the premium member. Further, the comment of the premium member may be set to the non-display as a paid service, with respect to a user who also wants to set the comment of the premium member to the non-display.

In addition, a user who makes a comment may be evaluated by the other user, on the basis of the contents of the comment, and in a case where only a comment of a user with high evaluation is displayed in the selected area, a user who performs viewing is capable of viewing a comment with high reliability, and this can be an incentive for making a more excellent comment, from the standpoint of making a comment.

It is obvious that such modes are implemented by being combined with each other.

Sixth Embodiment~ Electronic Book Reader

A reader for viewing an electronic book, such as Kindle (Registered Trademark), has been known, and the invention can also be applied and implemented in such an electronic book reader. Note that, in particular, a configuration for displaying the comment, and each configuration for setting the comment to the non-display inside the selected area, or on the contrary, for setting the comment to the non-display outside the area are same as those in the content distribution and reception system embodiment described above, and thus, the detailed description of the configurations will be omitted in order to avoid the repetition.

For example, a video content and an electronic book are different from each other in that, an image of frame unit is continuously played and a moving image is displayed, in the video content, but letter information and image information are stored in page unit and viewing is continuously performed by a manipulation for turning a page, in the electronic book.

FIG. 13 is a schematic view for describing the operation of the electronic book reader according to the invention.

FIG. 14 is a schematic view for describing the operation of the electronic book reader according to the invention.

FIG. 13 and FIG. 14 are diagrams schematically illustrating electronic book reader 61 according to the invention, and an opening portion of "I Am a Cat" (public-domain) written by Soseki NATSUME is used as an example in the drawings.

A display screen 61-1 is provided in the electronic book reader 61, and a body text 62 of an electronic book content and Japanese syllabaries 63 are displayed on the display screen ([FIG. 13] (A)).

In a case where the manipulator taps a part of the display screen by using a combination of a finger 65 of the manipulator or a protruding instrument such as a stylus pen, and a sensing device such as a touch panel, Japanese syllabaries can be set to the non-display in an area 64 that is tapped ([FIG. 13] (B)), or the Japanese syllabaries are displayed inside the area 64, and are set to the non-display outside the area 64 ([FIG. 13] (C)).

In particular, a smart phone has a small display screen, and thus, in a case where the area 64 is selected by being tapped with the finger, there is a concern that it is difficult to watch the display in the selected area 64.

Therefore, the area 64 separated from a tapped position by a predetermined distance d may be set to the selection area ([FIG. 14] (A)), the entire upper area 66 from a position tapped with the finger 65 may be set to the selection area ([FIG. 14] (B)), or the area 67 may be selected by a swipe operation for the finger 65 to slide on the display screen ([FIG. 14] (C)).

In addition, in a case where the area is selected by being repeatedly tapped with the finger, and as a result thereof, the selection area gradually increases, a production effect increases.

Seventh Embodiment~ Variation of Pointing Device Selection

In the content distribution and reception system that is each of the embodiments described above, in a case where the personal computer is used as means for selecting the area, the mouse has been mainly described as an example, in a case where the smart phone is used, the finger of the manipulator has been mainly described as an example, and in the electronic book reader or the smart phone, similarly, the combination of the finger of the manipulator, or for example, the stylus pen that is the protruding instrument, and the sensing means has been mainly described as an example of the means for selecting the area.

Needless to say, pointing means for selecting the area is not limited thereto, and a cursor movement manipulation key included in a keyboard, a combination of a light projection unit such as a laser pointer and a display panel with a light sensing function, a device sensing a visual line direction of the user, and the like can be used.

Further, there is also a method in which the area is selected by recognizing the voice or the like of the user, for example, by understanding an instruction such as "Left Half of Screen" or "More Down, There".

In addition, the user may repeatedly tap a cursor key or may repeatedly tap a touch sensor screen with the finger such that another mode display of the comment is effective during the repeated tapping. The reason for requiring such a configuration is that such a repeated tapping manipulation is used in games, various user interfaces, or the like, and thus, is a manipulation method with high affinity even for a user who plays and views a video.

In the implementation of the invention, a combination of the configurations of each of the embodiments described above, a combination of the technology of the related art and the combination described above may be used, and such combinations also correspond to the implementation of the invention.

In addition, in the description of each of the embodiments according to the invention, described above, a configuration in which the content (the broadcasting program) is recorded in advance in the distribution server, and the content is directly distributed to the viewer terminal from the distributor server, in accordance with the request from the viewer terminal, and is provided for viewing has been described as an example.

However, such a configuration is neither essential nor substantive for implementing the invention. That is, there can be a case where realtime broadcast, so-called live broadcast is performed.

A viewer viewing the live broadcast transmits a comment in real time with respect to the content that is being currently broadcast, and the transmitted comment is directly displayed on a live broadcast screen in real time.

In such live broadcast, another mode display of the comment when the content is played, described above, can be performed, and the same effects are obtained, and thus, this is included in the invention.

According to the invention, a server system, a distribution method, and a computer program with which in a content distribution system or the like in which a posted comment can be played together with a content, a desired object of each viewer can be viewed without being obstructed by the comment, and each of the comments can also be viewed can be provided.

The invention can be implemented in various other forms, and various omissions, substitutions, and changes can be made within a range not departing from the gist of the present invention. The embodiments and modifications thereof are included in the scope of the present invention described in the claims and the equivalent scope thereof, as well as in the scope and gist of the present invention.

REFERENCE SIGNS LIST

1 Content distribution and reception system
9 Smart phone
9-1 Display panel
9-2 Comment
9-3 Content display screen
9-4 Selected area
9-5 Display of person
9-6 Finger of manipulator
10 Viewer terminal
10-1 Display panel
10-1a Content display screen
10-1b Display of tree
10-1c Display of person
10-1d Display of house
10-1e Home button display
10-1f Stop button display
10-1g Pause button display
10-1h Play button display
10-1i Seek bar display
10-1j Seek button display
10-1k Comment display
10-1m Selected area
10-2 Display control unit
10-3 Memory
10-4 Control unit
10-5 Input/output interface
10-6 Keyboard
10-7 Mouse
10-8 Data bus line
10-9 Mouse cursor display
11 Viewer terminal
12 Viewer terminal
20 Distribution server
20-1 Input/output interface
20-2 Content recording unit
20-3 Comment recording unit
20-4 Data bus line
20-5 Control unit
20-6 Download program recording unit
30 Internet communication network
41 Superimposed layer
41-1 Cut-out content display area 41-2 Display of person
42 Comment layer
42-1 Comment
43 Content layer
43-1 Display of person
51 Comment layer
51-1 Comment
51-2 Comment non-display area
52 Content layer
52-1 Display of person
61 Electronic book reader
61-1 Electronic book display screen
62 Body text of electronic book
63 Japanese syllabaries of electronic book
64 Selected area
65 Finger of manipulator
66 Selected area
67 Selected area

The invention claimed is:

1. A server system, comprising:
a content distribution unit that distributes a video content and/or an image content for live broadcast or play to each of a plurality of terminals for viewing; and
a user posting information distribution unit that receives user posting information added by any one of each of the plurality of the terminals for viewing from the terminal, and distributes the user posting information to each of the terminals for viewing such that in each of the terminals for viewing including the terminal, the user posting information is superimposed over the video content and/or the image content on a display screen and is gradually moved over the display screen, in any one of a single server or a plurality of servers,
wherein the server system further comprises a program distribution unit that distributes a program for controlling a display mode of the user posting information inside or outside a specific area of the video content and/or the image content that is selected,
wherein the specific area of the video content and/or the image content is selected by each user from a plurality of users using an area selection unit provided in a viewing terminal that is any one of each of the plurality of terminals for viewing, during a period in which the selection is effective, in the viewing terminal, wherein the user posting information is not displayed while the user posting information is inside the specific area of the video content and/or the image content.

2. The server system according to claim 1, wherein the video content and/or the image content on the display screen is arranged in a content layer,
wherein the user posting information is arranged in a user posting information layer,
wherein the user posting information layer is superimposed over the content layer, and
wherein the specific area of the video content and/or the image content is an area that applied a transparent attribute to the content layer.

3. The server system according to claim 1, wherein the user posting information is not displayed inside the specific area of the video content and/or the image content by alternately repeating an operation for drawing a video image and an operation for drawing a comment outside the specific area every fixed time.

4. An application program distribution server, comprising:
a distribution unit that downloads and distributes an application program to be operated on each of a plurality of viewing terminals, wherein the application program is configured to be received on each of the plurality of viewing terminals and executed to control a display mode of a user posting information for live broadcast or play, wherein each of the plurality of viewing terminals:

receive the video content which is distributed by a content distribution server, display the video content on a display screen, receive, from a user posting information distribution server, the user posting information which is generated by any user from one of the plurality of viewing terminals, superimpose the user posting information over the video content on the display screen, gradually move the user posting information over the display screen, and allow a viewing user at each of the plurality of viewing terminals to individually select a specific area of the video content being displayed using an area selection unit, wherein the area selection unit receives a selection of the specific area of the video content from the viewing user at the respective viewing terminal and the selection of the specific area of the video content differs between each of the plurality of viewing terminals, wherein the user posting information is not displayed while the user posting information is inside the specific area of the video content selected by the viewing user at the respective viewing terminal.

5. A viewing terminal for viewing a video content for live broadcast or play, the terminal comprising:

a content receiving unit that receives the video content, which is that is distributed by a content distribution server, and displays the video content on a display screen;

a user posting information receiving unit that receives, from a user posting information distribution server, user posting information, which is generated by and which is added by any viewer of one of terminals viewing the video content, from a user posting information distribution server, that superimposes the user posting information over the video content on the display screen at the display timing, and that gradually moves the user posting information over the display screen; and an area selection unit that receives a selection of a specific area of the video content selected by a user of the viewing terminal,

wherein the viewing terminal is configured to allow the user of the viewing terminal to control, independent of other viewing terminals, a display mode of the user posting information inside or outside the specific area so selected, and wherein the user posting information is not displayed while the user posting information is inside the specific area of the video content.

6. A content viewing method for viewing a video content and/or an image content for live broadcast or play by using a viewing terminal, the method comprising:

a content receiving step of allowing a content receiving unit of the viewing terminal to receive the content that is distributed by a content distribution server and to display the content on a display screen;

a user posting information receiving step of allowing a user posting information receiving unit of the viewing terminal to receive user posting information added by any one of terminals viewing the content from a user posting information distribution server, to superimpose the user posting information over the content on the display screen and gradually moves the user posting information over the display screen; and an area selecting step of allowing an area selection unit of the viewing terminal to perform control such that a display mode of the user posting information inside or outside a specific area of the content that is selected is different when the specific area of the video content and/or the image content is selected, in the viewing terminal, wherein the specific area of the video content and/or the image content is selected by each user from a plurality of users using the area selection unit provided in the viewing terminal that is any one of each of the terminals for viewing, during a period in which the selection is effective, in the viewing terminal, wherein the user posting information is not displayed while the user posting information is inside the specific area of the video content and/or the image content.

7. A non-transitory computer-readable medium containing program code that causes a processor to execute each of the steps of the video content and/or the image content viewing method according to claim 6.

* * * * *